US007765685B2

(12) United States Patent
Brown

(10) Patent No.: US 7,765,685 B2
(45) Date of Patent: Aug. 3, 2010

(54) APPARATUS FOR TRANSPORTING PIPE FORMED FROM PIPE SEGMENTS

(76) Inventor: Claude Brown, 14281 Vintage Rd., Lodi, CA (US) 95240-9435

( * ) Notice: Subject to any disclaimer, the term of this patent is extended or adjusted under 35 U.S.C. 154(b) by 1299 days.

(21) Appl. No.: 11/249,074

(22) Filed: Oct. 11, 2005

(65) Prior Publication Data
US 2006/0201987 A1  Sep. 14, 2006

Related U.S. Application Data

(60) Provisional application No. 60/650,946, filed on Feb. 7, 2005.

(51) Int. Cl.
B23P 19/00 (2006.01)
(52) U.S. Cl. .................. 29/819; 226/181
(58) Field of Classification Search .......... 29/819, 29/822; 226/177, 181
See application file for complete search history.

(56) References Cited

U.S. PATENT DOCUMENTS

| 1,605,642 | A | * | 11/1926 | Blecker | 226/109 |
| 3,459,354 | A | | 8/1969 | Land et al. | 226/188 |
| 3,473,715 | A | | 10/1969 | Shuey | 226/177 |
| 3,506,174 | A | | 4/1970 | Shuey | 226/177 |
| 3,546,890 | A | | 12/1970 | Ede | 61/72.4 |
| 3,563,434 | A | | 2/1971 | Shriver et al. | 226/187 |
| 3,632,031 | A | | 1/1972 | Gurner et al. | 226/187 |
| 3,713,301 | A | | 1/1973 | Bryant | 61/72.6 |
| 3,986,652 | A | | 10/1976 | Perkins | 226/181 |
| 4,093,082 | A | | 6/1978 | Goodsell | 214/1 |
| 4,094,452 | A | * | 6/1978 | Makela | 226/34 |
| 4,165,830 | A | | 8/1979 | Svendsen | 226/187 |
| 4,285,454 | A | | 8/1981 | Plumettaz | 226/174 |
| 4,445,668 | A | | 5/1984 | Sauber | 254/287 |
| 4,469,267 | A | | 9/1984 | Franchuk et al. | 226/172 |
| 4,553,900 | A | | 11/1985 | Miller et al. | 414/745 |
| 4,779,784 | A | | 10/1988 | Giroux | 226/183 |
| 4,897,910 | A | | 2/1990 | Miller et al. | 29/426.3 |
| 5,839,613 | A | | 11/1998 | Marcout et al. | 226/176 |
| 5,934,536 | A | | 8/1999 | Shore et al. | 226/177 |
| 6,523,574 | B1 | * | 2/2003 | Taylor | 138/98 |
| 6,561,731 | B1 | | 5/2003 | Clare et al. | 405/36 |

OTHER PUBLICATIONS

Certa-Set™ Lateral and Certa-Lok™ Main Line, Product Specification and Installation Guide, 8 pages, 2001.
Certa-Set™ PVC Irrigation Piping Systems, 3 pages, Jan. 2000.

* cited by examiner

*Primary Examiner*—Jermie E Cozart
(74) *Attorney, Agent, or Firm*—Steven R. Vosen

(57) ABSTRACT

An apparatus and method are described for assembling and disassembling pipe. The device has a drive mechanism that be used to either assemble or disassemble pipe. The drive mechanism has two independent traction drives that can independently impart longitudinal forces on a pipe, either in the same or opposing directions. The drive unit can thus transport pipe or can facilitate the assembly of pipe from modular units or the disassembly of pipe into modular units. The method includes pulling or pushing pipe from the field from a fixed location with a traction device.

26 Claims, 20 Drawing Sheets

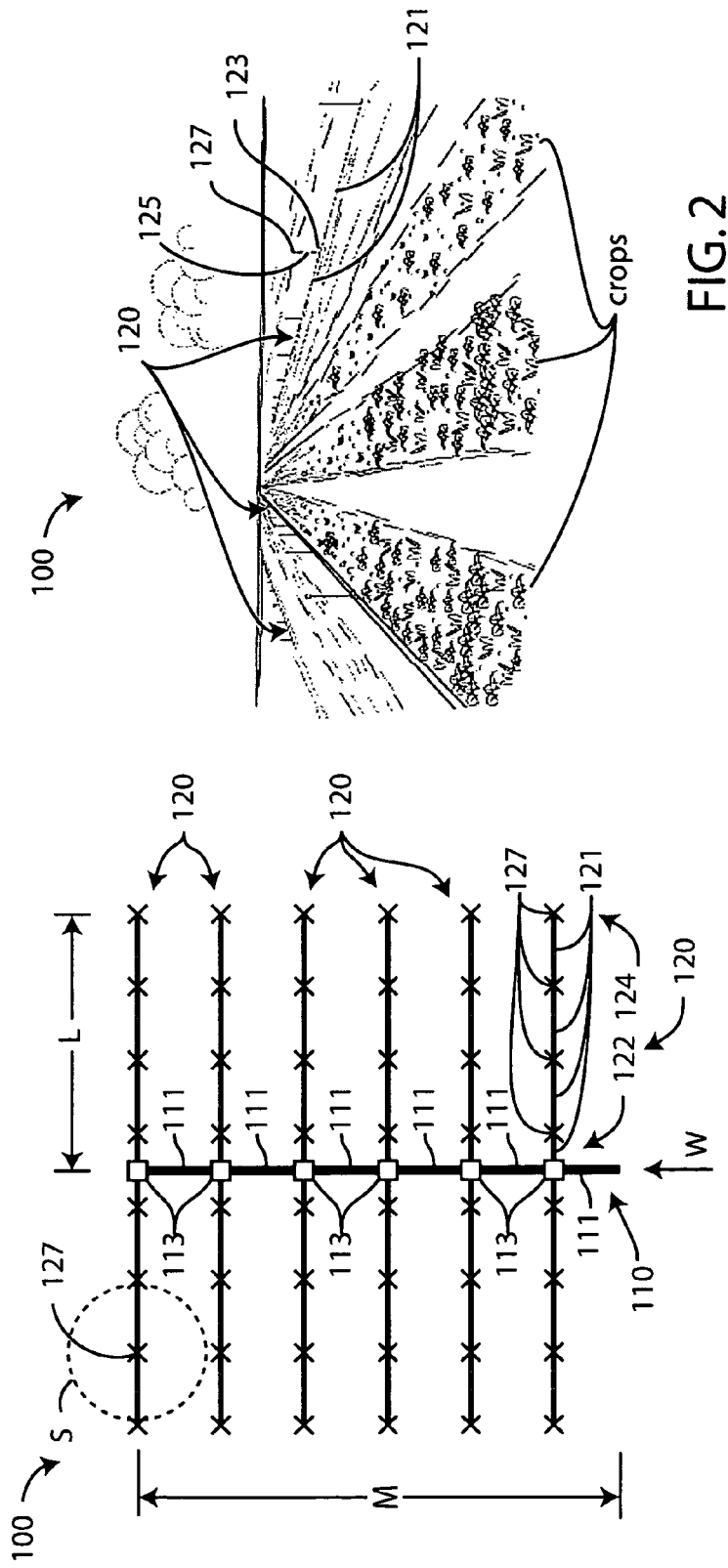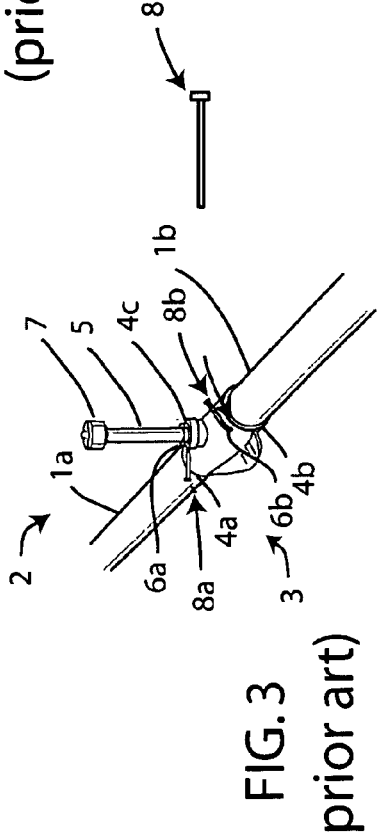
FIG. 1 (prior art)
FIG. 2 (prior art)
FIG. 3 (prior art)

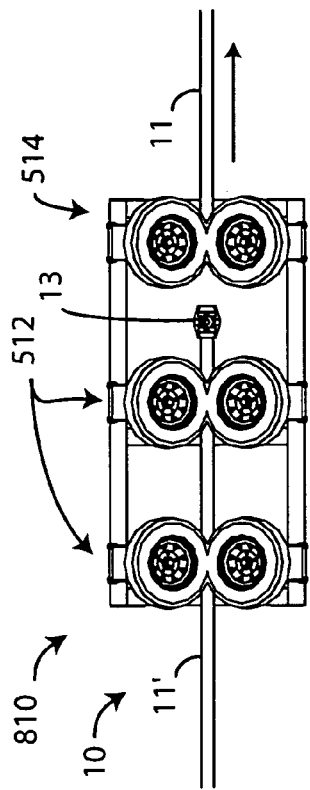
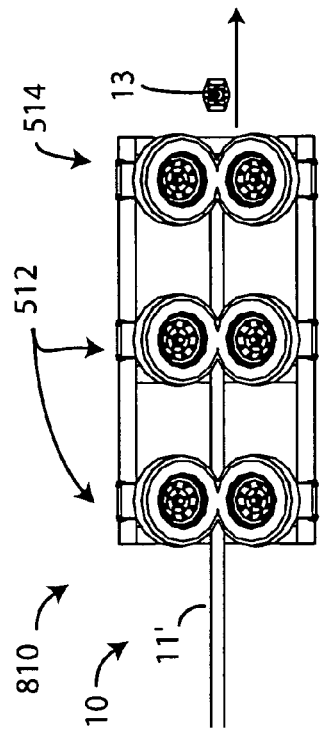
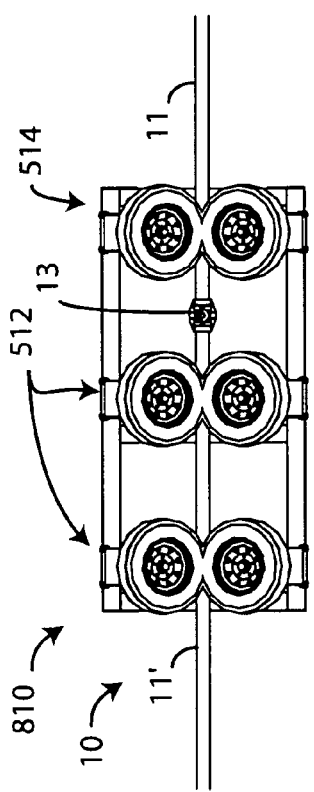
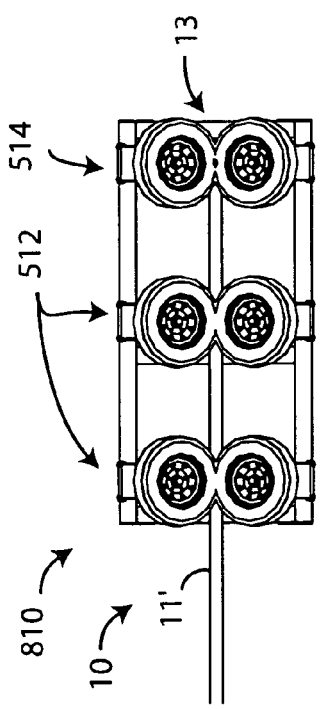
FIG. 20A
FIG. 20B
FIG. 20C
FIG. 20D

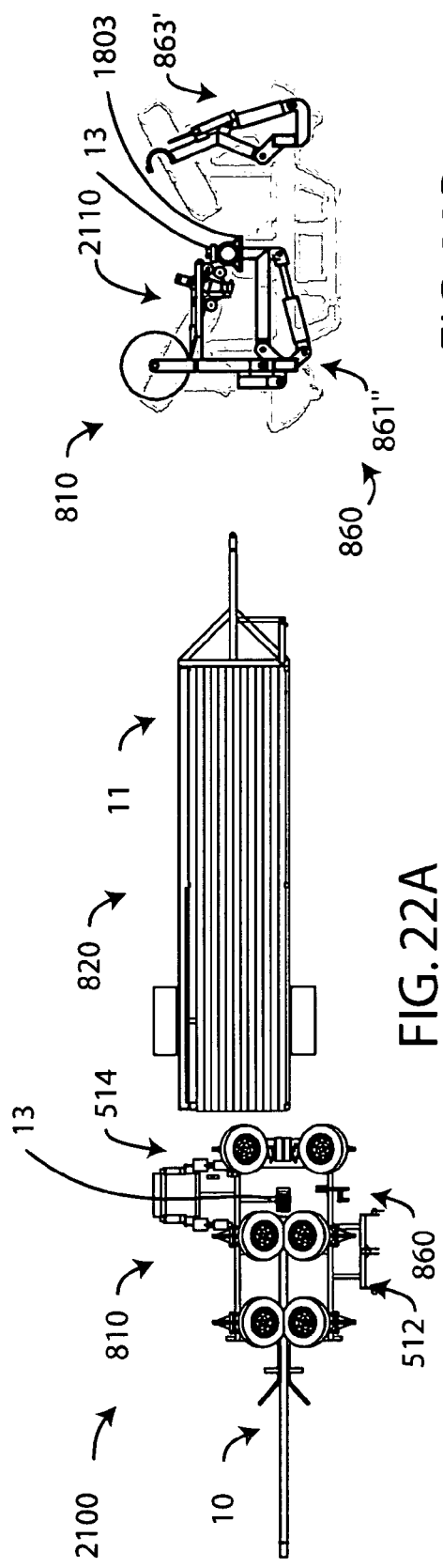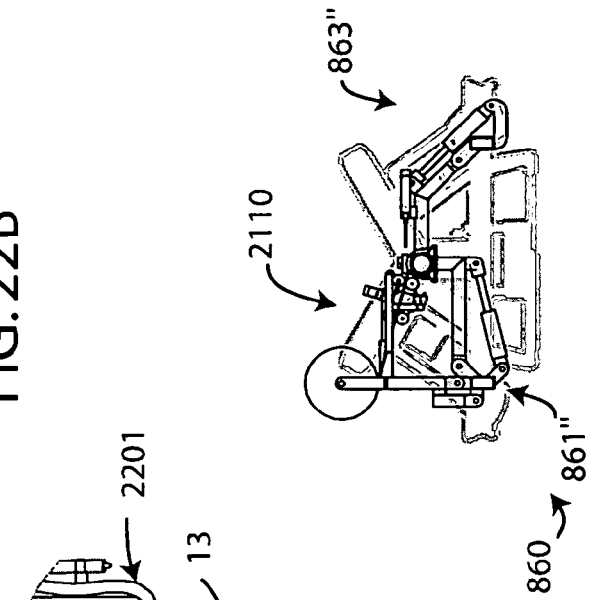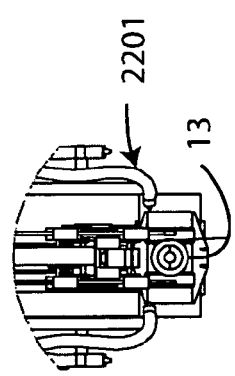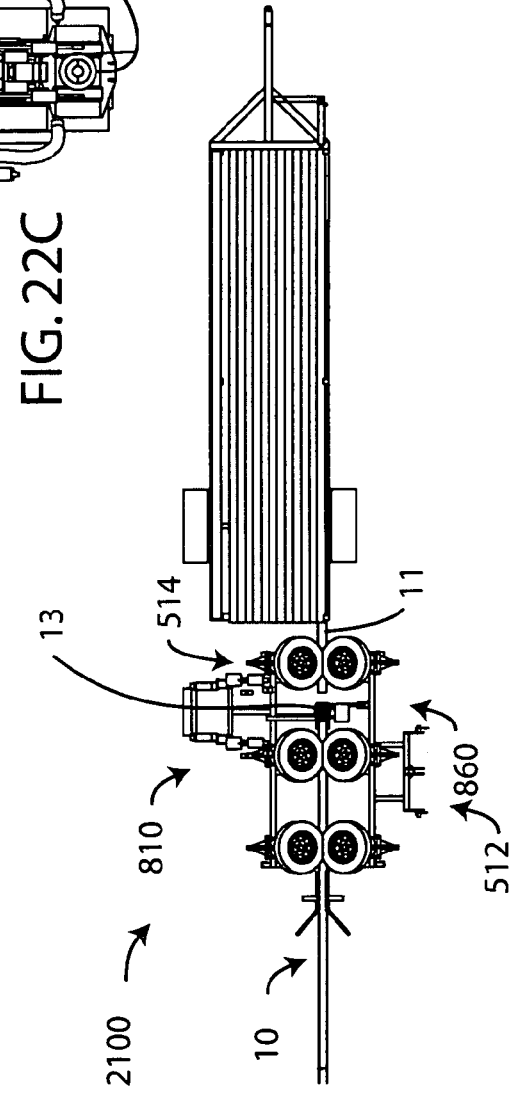
FIG. 22A
FIG. 22B
FIG. 22C
FIG. 23A
FIG. 23B

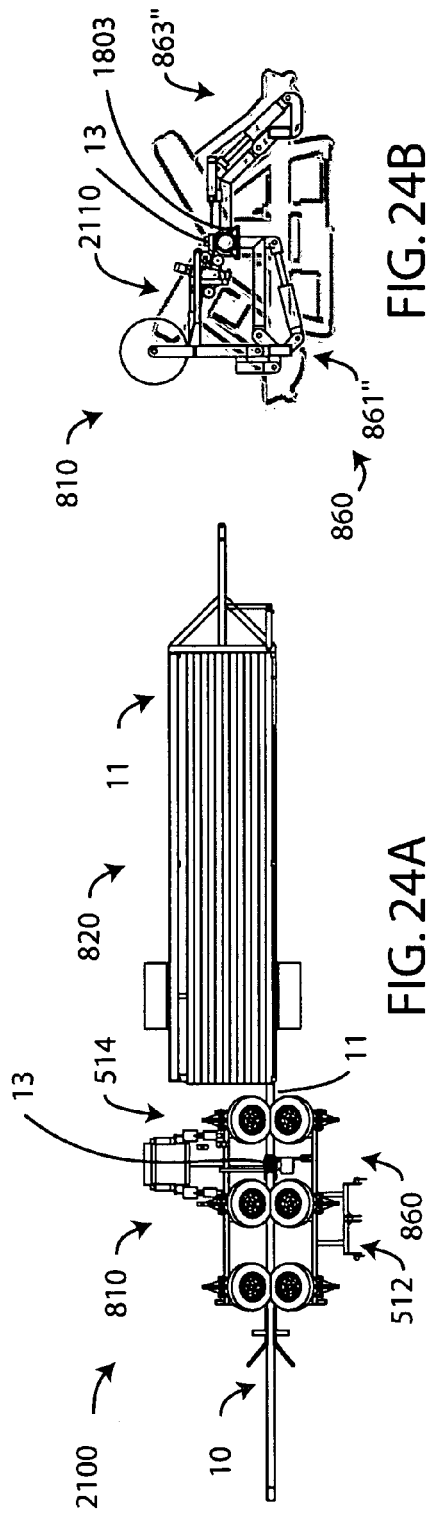
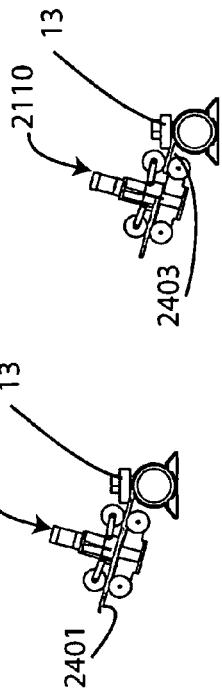
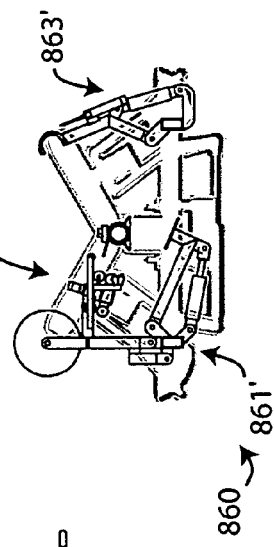
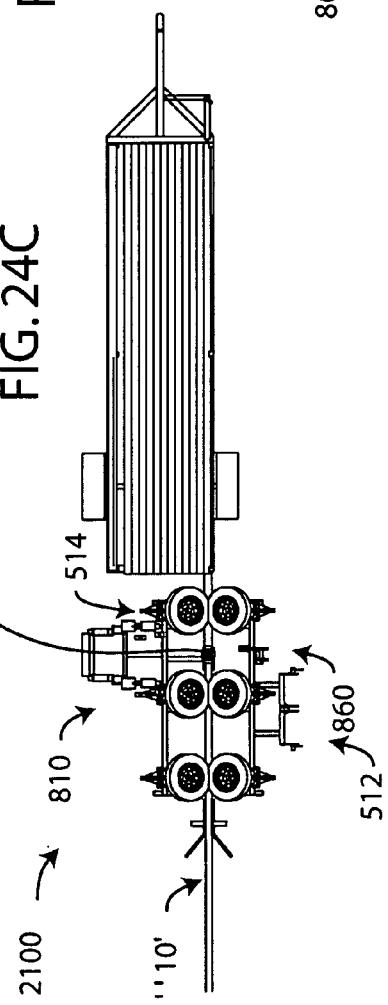
FIG. 24A
FIG. 24B
FIG. 24C
FIG. 24D
FIG. 25A
FIG. 25B

APPARATUS FOR TRANSPORTING PIPE FORMED FROM PIPE SEGMENTS

CROSS-REFERENCE TO RELATED APPLICATIONS

This application claims the benefit of U.S. Provisional Application No. 60/650,946, filed Feb. 7, 2005, the contents of which are incorporated herein by reference.

BACKGROUND OF THE INVENTION

1. Field of the Invention

The present invention generally relates to devices and methods for manipulating piping, and more particularly to a method and system for assembly and disassembly of pipes in and on the ground.

2. Discussion of the Background

In many agricultural and horticultural settings, rigid, above-ground, portable sprinkler systems are used for irrigation of crops, pasture, trees, or grasses, etc. These systems have, over the years, replaced many other forms of irrigation, such as flood irrigation, because they minimize erosion, prevent many drainage problems, do not require land leveling, and generally provide a uniform application of moisture to irrigate crops on a variety of terrains and minimal management expertise while conserving water. Sprinkler irrigation systems are typically constructed from modular sections of either aluminum or polyvinyl chloride (PVC) that include pipes, risers, sprinkler heads and connectors that are assembled and disassembled in the field as needed.

One common irrigation system, often called a "solid-set" system, includes a main line that provides water to a plurality of lateral irrigation lines. Each lateral line has a plurality of sprinkler heads positioned to irrigate a field. In some solid-set systems, the lateral lines provide water to the entire field. Other solid-set systems, the lateral lines provide water to only a portion of the field, and the lateral lines are disassembled and then reassembled at different positions along the main line as needed. When the irrigation season is over, the solid-set system may be disconnected and stored so that the crops may be harvested and the ground may be worked in preparation for the next growing season.

Examples of prior art solid-set irrigation systems are shown in FIGS. 1-4 where: FIG. 1 shows a top schematic view of a system 100 for irrigating a field with a single set-up; FIGS. 4A and 4B show top schematic views of another prior art solid-set irrigation system using multiple set-ups as a first system 100' and a second system 100"; FIG. 2 is a perspective view of FIGS. 1, 4A and 4B, and FIG. 3 is a perspective view of a specific coupler.

With reference to FIG. 1, system 100 includes a main line 110 that accepts a flow of water W from a pump (not shown) and that has a length M over which water is delivered to several lateral irrigation lines 120 each having a length L and arranged parallel on a field. Thus, for example, it is common to use a solid-set irrigation system to irrigate row crops having, for example, lateral lines with sprinkler heads on 30 or 40 foot linear spacing and 40 feet between lateral lines, and the length L can be from 20 feet to half a mile. Typically, the diameter of irrigation main line 110 is from 6 to 12 inches and the diameter of lateral lines 120 are from 1½ to 4 inches. Alternatively, the length and/or pattern of lateral lines 120 can be different from line to line to irrigate an irregular shaped plot of land.

With reference to FIGS. 4A and 4B, first and second systems 100' and 100" have a main line with several connectors (113a, 113b, 113c, 113d, 113e, and 113f) and two lateral lines (120a and 120b). By moving lateral lines 120a and 120b from the position shown in system 100' to the position shown in system 100" the entire field may be irrigated by sequentially watering different portions at a time. Thus system 100' has lateral line 120a joined to connector 113a and lateral line 120b is joined to connector 113d, irrigating only a portion of the filed. At a later time, the solid-set system is reconfigured as system 100", with lateral line 120a joined to connector 113b and lateral line 120b is joined to connector 113e, thus irrigating a different portion of the field.

Irrigation systems 100, 100', and 100" are formed from a collection of modular pipe, coupler, and sprinkler segments. Thus, for example, main line 110 includes a plurality of main line pipe segments 111, with adjacent segments are joined by one of a plurality of couplers 113. Each lateral line 120 includes a plurality of lateral pipe segments 121, with adjacent segments joined by one of a plurality of couplers 123. Each lateral line 120 extends length L from an end 112 that is connected to main line 120 at one of couplers 123 to another end 114. As shown in FIG. 2, each connector 123 is also attached to a riser 125 that protrude from the field and terminates with a sprinkler head 127. Commonly used materials include aluminum, polyethylene, or PVC tubing, and stainless steel and/or polyethylene or nylon fittings.

One particularly useful solid-set irrigation system includes tubing and couplers of PVC, such as the YELOMINE™ CERTA-LOK™ main line and the YELOMINE™ CERTA-SET™ lateral line systems, manufactured by the Certain Teed Corporation, Pipe and Plastics Group, Valley Forge, Pa. In these solid-set systems, pipe segments are joined using coupling devices that allow for rapid breakdown and packaging of the system. This system is particularly easy to use, as the pipes are spline-coupled—that is, they are held together with "splines" that are inserted into the coupler. The couplers include an o-ring to seal against an accepted pipe, and the couplers and pipe ends have matching circumferential grooves for accepting the spline. The spline is a flexible elongated strip the fits within the matching circumferential grooves and that, when inserted, keeps the joint together by preventing relative lateral motion.

An example of a CERTA-LOK™ or CERTA-SET™ pipe and coupler is illustrated in the perspective view of FIG. 3. A pipe 2, such as lateral line 120, is shown as being formed from tube or pipe segments 1, indicated as a first pipe segment 1a and a second pipe segment 1b joined by a coupler 3. Coupler 3 also includes an adapter 4c for accepting lateral pipes, such as a riser 5 terminated by a sprinkler head 7. Alternatively, pipe 2 can be main line 110 with adapter 4c configured to accept a lateral line 120, or coupler 3 can be configured to joint adjacent segments without an adapter to another pipe or riser.

Coupler 3 has a first end 4a for accepting first pipe segment 1a and a hole 6a for inserting a spline 8, such as a first spline 8a, and a second end 4b for accepting second pipe segment 1b and a hole 6b for inserting spline 8, such as a second spline 8b. When each end 4a, 4b accepts an end of a pipe segment 1a, 1b, grooves within each end and the corresponding end of pipe segment 1a, 1b form a groove for accepting an inserted spline 8a, 8b to laterally restrain the pipe segments. Removal of a spline 8 allows for removal of the corresponding pipe segment 1 from the coupler.

When properly seated, the groove can accept a spline that is removably insertable through the side of the coupler. An accepted spline nearly encircles the pipe and coupler and prevents relative longitudinal movement of the pipe and coupler. Coupling is accomplished by pushing the pipe and coupler together and inserting a spline. Decoupling is accomplished by pulling a spline from the coupler of a coupled pipe and pulling the pipe and couplers apart. A sprinkler having a reactionary drive mechanism may be coupled to any of the couplers through quick coupling risers, or by pinning or threading.

The assembly or disassembly of solid-set irrigation systems is commonly performed by arranging pipe segments and coupling or decoupling them, respectively. The assembly and disassembly is usually performed manually in the field. Although the advent of PVC solid-set irrigation systems is lighter and couples more easily that metal irrigation systems, such systems still require considerable time and effort for assembling and disassembling. This work includes the placement and movement of heavy and bulky pipe segments that requires teams of workers. After irrigation the pipe segments are embedded in the mud, making movement difficult. The manual manipulation of piping requires a lot of work that is difficult to do on a timely basis. Occasionally the work results in injury to the workers and delays due to mud in the field.

Some devices have been proposed to automate the assembly irrigation pipes. These systems require the movement of pipe segments, couplers and risers across the field. Such systems are not useful for systems requiring the movement of lateral lines during a growing season since the use of the devices would disrupt large portions of the cultivated field.

Other devices have been proposed to automate the disassembly of irrigation pipes by grabbing portions of the pipe and pull them out of the field. These systems can damage piping and are not useful for assembling pipe. In addition, these other devices are typically too wide to fit the existing head lands of the field.

While the use of solid-set irrigation systems has greatly improved the ability to irrigate, and while plastic piping, such as PVC piping has made such systems more robust and easier to assemble and disassemble, there are still several problems. Thus, for example, the assembly and disassembly is either performed manually by teams of workers or by proposed devices that are not useful for all uses and applications.

Thus there is a need in the art for a method and apparatus that permits for the easy assembly and disassembly of modular piping systems. Such a method and apparatus should be compatible with existing piping systems, be useful for a variety of solid-set irrigation set-ups, facilitate the coupling or decoupling of pipe components, and should not damage the pipe or components. There is also a need for a system and method for removing piping from the field while the field is still wet.

BRIEF SUMMARY OF THE INVENTION

The present invention overcomes the disadvantages of prior art by providing a device and method for moving, assembling and disassembling pipes assembled from modular units.

The present invention overcomes the limitations and problems of the prior art using two or more independently controllable drive units that engages the outer surface of the pipe and pipe components, and that facilitates coupling and decoupling of the pipe.

It is one aspect of the present invention to provide a device having a drive that can transport pipe and that can push and pull pipe components to aid in coupling or decoupling of the pipes.

It is another aspect of the present invention to provide a device having two independently controlled drive mechanisms. The drive mechanisms are configured to apply longitudinal forces to a pipe in either the same or opposing directions.

It is another aspect of the present invention to provide a method for assembling pipe in the field. The method includes feeding pipe segments into a drive mechanism that couples the segment into an existing length of pipe, and then transporting the pipe into the field.

It is yet another aspect of the present invention to provide a method for disassembling pipe in the field. The method includes pulling the pipe from the field through a drive mechanism that also decouples the pipe into segments.

These features together with the various ancillary provisions and features which will become apparent to those skilled in the art from the following detailed description, are attained by the exercise device of the present invention, preferred embodiments thereof being shown with reference to the accompanying drawings, by way of example only, wherein:

BRIEF DESCRIPTION OF THE SEVERAL VIEWS OF THE DRAWING

FIG. 1 is a top schematic view of a prior art solid-set irrigation system arrangement;

FIG. 2 is perspective view of a prior art solid-set irrigation system;

FIG. 3 is a perspective view of a CERTA-LOK™ or CERTA-SET™ pipe and coupler of the prior art;

FIG. 6A shows a length of pipe partially assembled, FIG. 6B shows a pipe section and coupler being placed near an end of the pipe, FIG. 6C shows the pipe section being coupled to the end of the pipe, and FIG. 6D shows the pipe and newly coupled section being pulled into a field;

FIG. 7A shows the end of a length of pipe accepted by the device, FIG. 7B shows the end of pipe pulled into the device, FIG. 7C shows the pipe section and coupler removed from the pipe, and FIG. 7D shows the pipe with the pipe section and coupler stored;

FIG. 8 is a top view of a tractor connected to the device, FIG. 9 is a top view of a pipe drive mechanism and a pipe carrier, FIG. 10 is a perspective view of the pipe drive mechanism of FIG. 8, FIG. 111 is sectional view 11-11 of FIG. 8, and FIG. 12 is sectional view 12-12 of FIG. 8;

FIGS. 14A, 14B, and 14C are a top view, side view A-A of FIG. 9, and sectional side view B-B of FIG. 9, respectively, showing the device accepting the end of a pipe, FIGS. 15A, 15B, 15C, 15D, and 15E are a top view, side view A-A, and three sectional side views B-B, respectively, of FIG. 15A of the coupler handling mechanism restraining the coupler, FIGS. 16A and 16B are a top and sectional side view B-B showing a disassembled pipe segment separated from the pipe, and FIG. 17 is a side view A-A of the pipe segment being moved by the pipe carrier;

FIGS. 20A, 20B, 20C, and 20D are sequential top views the pipe drive mechanism for a second alternative decoupling method;

FIGS. 22-25 are sequential views of the pipe manipulation device of FIG. 21 assembling pipe, where FIGS. 22A, 22B, and 22C are a top view, a side view C-C of FIG. 21, and a top detail views, respectively, of the device accepting a coupling, FIGS. 23A and 23B are a top view and a side views C-C, respectively, views of the device joining the coupling to one pipe segment, FIGS. 24A, 24B, 24C, and 24D are a top view and several side views C-C, respectively, views of the device joining the coupling to the other adjoining pipe segment, and FIGS. 25A and 25B are a top view and a side view C-C, respectively, views of the device releasing the pipe for deployment in the field;

Reference symbols are used in the Figures to indicate certain components, aspects or features shown therein, with reference symbols common to more than one Figure indicating like components, aspects or features shown therein.

DETAILED DESCRIPTION OF THE INVENTION

Although certain preferred embodiments and examples are disclosed below, it will be understood by those skilled in the art that the invention extends beyond the specifically disclosed embodiments to other alternative embodiments and/or uses of the invention and obvious modifications and equivalents thereof. Thus it is intended that the scope of the invention herein disclosed should not be limited by the particular disclosed embodiments described below. In any method disclosed herein, the acts or operations making up the method/process may be performed in any suitable sequence, and are not necessarily limited to any particular disclosed sequence. For purposes of contrasting various embodiments with the prior art, certain aspects and advantages of these embodiments are described where appropriate herein. Of course, it is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

The present invention provides a method and system for the manipulation of piping in the field—that is, for assembling and/or disassembling and moving of pipe. The present invention can be used to manipulate piping for a variety of applications, including but not limited to, irrigation systems or for other portable systems such as emergency response, waste water spray fields, dust control, and pipelines for the chemical industry, construction, such as electrical conduits, public works, such as water and sewer lines, and pollution control. Particular embodiments of the present invention are described herein as a method and system for manipulating pipes for solid-set irrigation systems. These embodiments are presented for illustrative purposes only, and are not meant to limit the scope of the present invention.

Figures 4A, 4B:
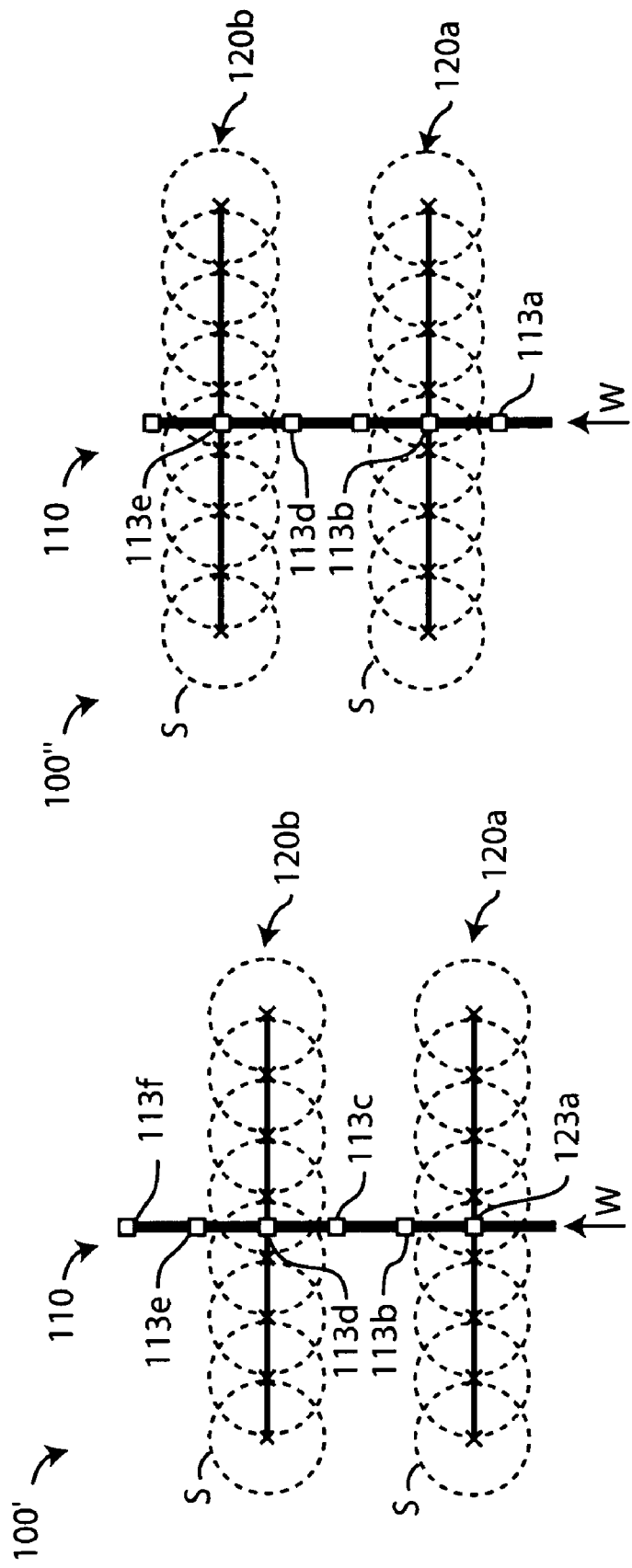
FIGS. 4A and 4B are top schematic views of another prior art irrigation system arrangement for sequentially irrigating different parts of a field, where FIG. 4A has lateral lines at one position along the main line and FIG. 4B has the same lateral lines moved to another position along the main line.
Figure 5A:
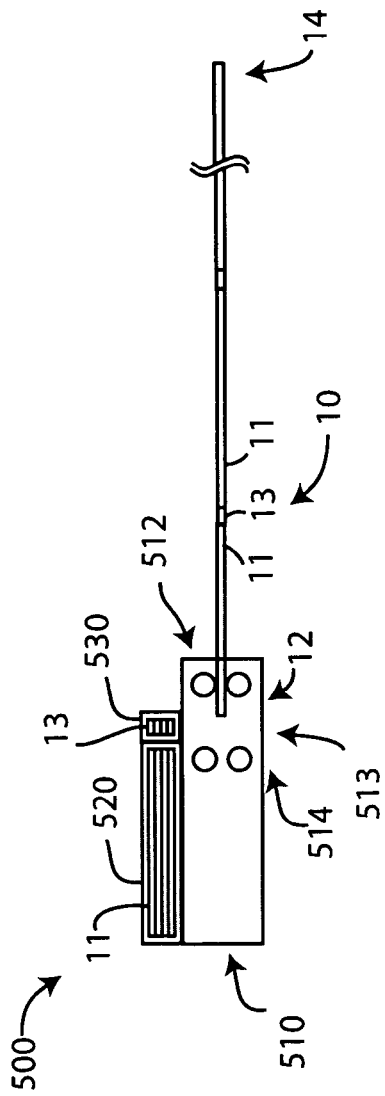
FIGS. 5A and 5B are top and side views, respectively, of a first embodiment pipe manipulation device of the present invention.
Figure 5B:
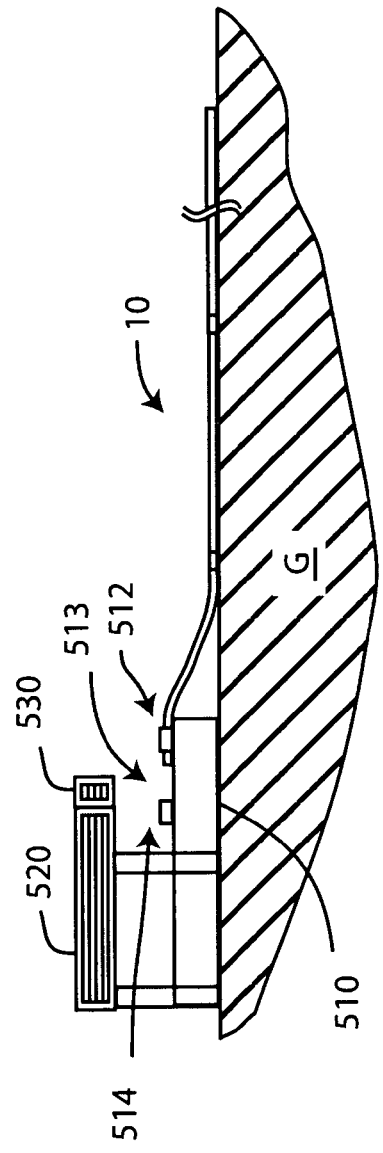

FIGS. 5A and 5B are top and side views, respectively, of a first embodiment pipe manipulation device 500 of the present invention. Device 500 is shown as being on ground G and including a pipe drive mechanism 510 having a first mechanism 512 and a second mechanism 514 that can each impart forces on a pipe or pipe sections on either side of a region 513 between the first and second mechanisms, a pipe carrier 520, and a coupler carrier 530. Each mechanism 512 and 514 is capable of imparting longitudinal forces, including forces in the same direction and forces in opposite directions. In one embodiment of the present invention, region 513 contains a workstation for coupling and decoupling pipe, either manually or through other devices. Device 500 can be used to assemble or disassemble pipe, automating some or all of the coupling and decoupling actions required for a particular type of modular pipe.

Device 500 is shown, for illustrative purposes, in FIGS. 5A and 5B with pipe drive mechanism 510 engaging an end 12 of pipe 10 formed from a plurality of pipe segments 11 and pipe couplers 13 and having an end 14 distal from the device. Pipe 10 is manipulated by device 500 and does not form part of the present invention. Device 500 may accept pipe 10 of various diameters and can assemble or disassemble segments 11 having differing lengths and/or pipe couplers 13. Thus, for example, segments 11 may have, but are not limited to, length of 20 feet, 30 feet, or 40 feet. In addition, the present invention is not limited to pipes of any particular diameter. Pipe 10 may have, but is not limited to, a diameter ranging from approximately one inch to approximately one and a half feet. Thus, for example, pipe 10 may have a diameter ranging from 1½ to 4 inches, as is typical of lateral irrigation lines, or it may have a diameter ranging from 6 to 12 inches, as is typical of main irrigation lines.

Except as further detailed below, the present invention is adapted to work on pipes that include, but are not limited to, pipes that are joined by threading, or with lock rings or splines, glued, thermal welded, or flanged, and for couplers that are separate from the pipe segments, that are integrally incorporated into or affixed to the pipe segments. In addition, device 500 allows pipe having risers extending away from the pipe to be manipulated without damaging the pipe, connector, riser, or sprinkler head. Thus, for example, in one embodiment of the present invention, device 500 is adapted to assemble and/or disassemble pipe 10 that may be a prior art pipe 2 as shown in FIG. 3, where pipe segment 11 is a segment 1 and pipe coupler 13 is coupler 3 with or without an attached riser 5 or sprinkler head 7.

Device 500 can be used to manipulate pipe formed of discrete pipe sections and couplers that hold the pipe sections together. Thus, for example, as described subsequently, device 500 can be used to either assemble pipe from modular segments, for example by sequentially connecting two or more tube or pipe segments 11 into pipe 10, or to disassemble pipe 10 into component pipe segments 11 and couplers 13. Preferably, pipe segments are formed from a sturdy material and can be joined at the pipe ends or with interposed couplers, and that can bend a significant amount, such as through 0 to 30 degrees, without breaking.

One example of pipe that can be used with the present invention is formed from segments and couplers of PVC. While the invention is described herein in connection with PVC pipe and couplers, such as the couplers of FIG. 3, those skilled in the art will appreciate that other materials can be used to practice the invention. For example, the invention may be practiced with aluminum or polyethylene tubing, and with stainless steel and/or polyethylene or nylon fittings.

One embodiment of a method of using device 500 is shown in FIGS. 5A and 5B as being positioned on a fixed location of the ground G for manipulating pipe for coupling, decoupling and transporting by the action of forces imposed by pipe drive mechanism 510. Device 500 is shown in FIGS. 5A and 5B with pipe carrier 520 having a plurality of pipe segments 11, and with coupler carrier 530 having a plurality of pipe couplers 13. Pipe carrier 520 includes mechanisms for transporting pipe segments 11 to and from pipe drive mechanism 510. Coupler carrier 530 includes mechanisms for transporting pipe couplers 13 to and from the pipe drive mechanism 510. Alternatively, coupler carrier 530 includes a bin for holding pipe couplers 13 which are manually put in place for assembly or removed for disassembly.

While device 500 is generally useful for either assembling or disassembling pipe, not all portions of device 500 may be required for a particular task, such as assembling pipe or disassembling pipe. Thus, various embodiments of device 500 include pipe drive mechanism 510 and some or all of the other portions of the device, such as a pipe carrier 520 and/or coupler carrier 530 as required to perform a particular task.

In general, pipe drive mechanism 510 includes mechanisms 512 and 514 to engage a portion of the pipe and cooperatively impart longitudinal forces to move and/or restrain pipe, pipe segments, or couplers. In several embodiments of the present invention, mechanisms 512 and/or 514 include frictional, or traction, members that are controllably driven to impart longitudinal forces on the portion of the pipe within the mechanism. Examples of mechanisms 512 and 514 include, but are not limited to, frictional members can be opposing rotating surface, such as pneumatic or rubber wheels and/or rotors such that grip a pipe or pipe section and impart a longitudinal force when rotated, longitudinally extending traction members, other members that grip or slidably engage the outer portion of a pipe or pipe sections, and or any combination thereof. It is preferred that mechanism 512 and/or 514 includes a drive mechanism that can impart sufficient force to transport a length of pipe at a speed of from 0 to 250 feet per minute or more. In one embodiment, mechanism 512 and/or 514 imparts a force over a length greater than the longitudinal extent of a coupler so that traction is not lost when a coupler passes through one of the mechanisms. Alternatively, both mechanisms 512 and 514 impart forces over lengths greater than the longitudinal extent of a coupler. In another embodiment of the present invention, one or both of mechanisms 512, 514 is adjustable between a first configuration for providing forces to an accepted pipe and a second configuration to allow a pipe to be removed from the mechanism.

Importantly, pipe drive mechanism 500 includes multiple mechanisms that are controlled to impart forces in the same or opposite direction to aid in the coupling and decoupling of the pipe. In one embodiment, first mechanism 512 is independently controllable and to act, when required, to restrain pipe or to force the pipe in a direction opposite to that imparted by second mechanism 514. Mechanisms 512 and 514 may thus both engage the same pipe segment of pipe 10, preferably forcing the pipe in one direction or another, or they may both engage different and adjacent pipe sections for coupling and decoupling pipe segments. The forces for coupling and decoupling can impart forces longitudinally on adjacent pipe sections towards one another, such as to force two pipe ends together, as in an assembly procedure, for example, or impart forces longitudinally on adjacent pipe sections away from one another, such as to force two pipe ends away from each other, as in a disassembly procedure, for example.

Alternative embodiments of device 500 include, but is not limited to, devices for the manipulation of pipe where the coupler is integral with or is previously attached to one end of each pipe segment, the manipulation of pipes having risers and/or sprinkler heads attached to couplers, and devices that automate the connection process, for example by rotating threaded connectors or supplying splines or clamps to appropriate connectors. Alternative embodiments of pipe drive mechanisms 510 include, but are not limited to, mechanisms that are reversible to allow the assembly and disassembly from either end, and mechanisms that includes three or more devices that are each capable of imparting longitudinal forces in the same or opposing directions.

Figures 6A, 6B, 6C, 6D:
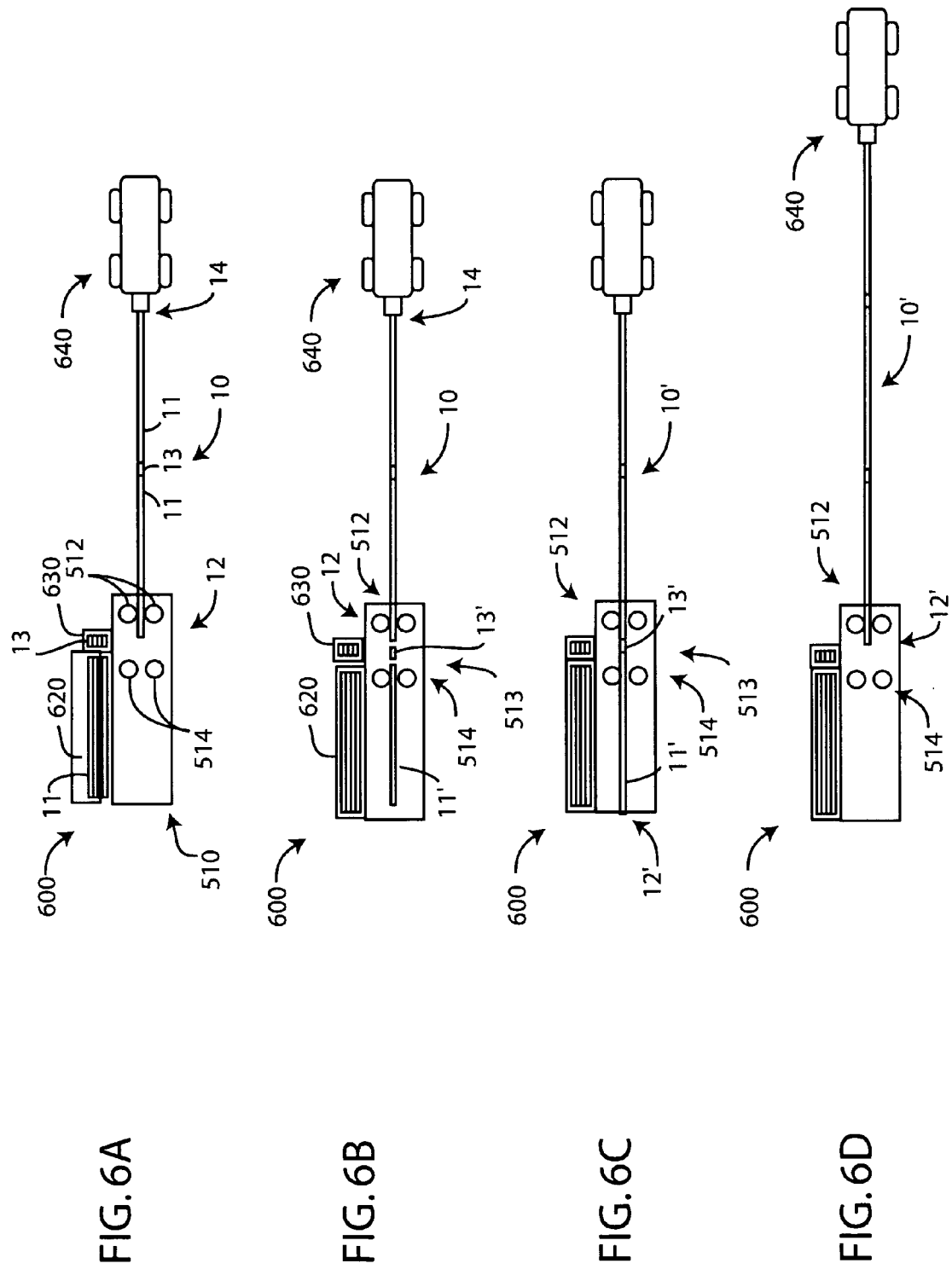
FIGS. 6A-6D are top, sequential views of a first alternative of the pipe manipulation device of FIGS. 5A and 5B assembling irrigation pipe, where

FIGS. 6A-6D depict another embodiment of device 500 as a first alternative pipe manipulation device 600, which may be generally similar to the embodiment illustrated in FIGS. 5A and 5B, except as further detailed below. Where possible, similar elements are identified with identical reference numerals in the depiction of the embodiments of FIGS. 5A and 5B. Device 600 thus includes, for example, pipe drive mechanism 510, pipe carrier 620, and coupler carrier 630. The sequence of FIGS. 6A through 6D illustrate one embodiment of a method of assembly pipe using device 600 to form pipe 10 from a plurality of pipe sections 11. More specifically, FIG. 6A shows a length of pipe partially assembled, FIG. 6B shows a pipe section and coupler being placed near an end of the pipe, FIG. 6C shows the pipe section being coupled to the end of the pipe, and FIG. 6D shows the pipe and newly coupled section being pulled into a field. In addition to the method illustrated in FIGS. 6A-6D, device 600 may also be operated to disassemble of pipe.

With reference to FIGS. 6A-6D, a method of assembling pipe is illustrated. Device 600 is positioned on the ground and, through the manipulation of segments 11 and couplers 13, produces pipe 10 of increasing length, with end 14 moving away from the device. The addition of length to pipe 10 is shown in FIGS. 6B through 6D. As shown in FIG. 6B, end 12 is within first mechanism 512 with coupler 13 within region 513. A single segment 11' is removed by a mechanism, not shown in FIG. 6, from pipe carrier 620 and aligned near end 12 and within second mechanism 514, and a pipe coupler 13' is removed from pipe coupler carrier 530 and placed between end 12 and segment 11'. Pipe coupler 13' is placed between end 12 and segment 11' manually. Alternatively, coupler 13' is placed between end 12 and segment 11' by a device 600.

Next, as shown in FIG. 6C, pipe segment 11' and coupler 13' are brought together within region 513 and coupled to pipe 10, resulting in a pipe 10' having an increased length and an end 12'. Preferably, pipe drive mechanism 510 imparts different longitudinal forces to pipe segment 11' and end 12 to facilitate their joining to form pipe 10'. In one embodiment of the present invention, pipe segment 11' is held in place by being gripped by second mechanism, while end 12, coupler 13', and segment 11' are brought together by a longitudinal force of first mechanism 512 on end 12 in a direction towards the pipe segment. In another embodiment of the present invention, end 12 and pipe segment 11' are forced in opposite directions and towards coupler 13' and each other.

Additionally, dependent on the particular coupling mechanism employed by pipe 10, other actions may be required for joining, either concurrent with or after the forcing of pipe segment 11' into end 12, including, but not limited to, the cleaning or lubricating of one or more meeting surfaces, a rotation about the longitudinal axis of the pipe, or the actuating or placement of retaining pieces at the joint. As one example of additional actions the pipe system shown in FIG. 3, end 12 and the end of pipe segment 11' inserted into coupler 13' are preferably cleaned and/or lubricated prior to coupling, and splines, such as splines 8a and 8b are inserted into coupler 13' to join pipe 10 to pipe segment 11'.

After pipe 10' is formed by joining pipe segment 11' to pipe 10, as shown in FIG. 6D, pipe 10' is transported from device 600 by first mechanism 512. In one embodiment of the present invention, end 14 is supported and pulled by a vehicle 640, such as a tractor or an all terrain vehicle, with or without the assistance of a force from first mechanism 512, as pipe 10' is transported into the field. In an alternative embodiment, end 14 is a free end that is pushed by pipe drive mechanism 512. Alternately, the force for transporting pipe 10' is assisted by second mechanism 514. Additional length of pipe is then added by repeating the steps illustrated in FIGS. 6B-6D.

FIGS. 7A-7D shows sequential view of a second alternative embodiment of device 500 as a second alternative pipe manipulation device 700 for disassembling irrigation pipe, including a pipe carrier 720 and a coupler carrier 730. Device 700 is useful for assembly or disassembly of pipe, or is configured for only for disassembly of pipe. Device 700, including pipe drive mechanism 510, pipe carrier 720 and coupler carrier 730, may be generally similar the device of FIGS. 5-6, and are, for example, similar to devices 500 and 600 disclosed herein, except as further discussed below.

Device 700 is used to disassemble a length of pipe 10 by removing one or more pipe segments 11. For illustrative purposes, the pipe section at end 12 is denoted as pipe section 11', which is joined by pipe coupler 13' to a pipe section 11". Specifically, FIG. 7A shows the end of a length of pipe 10 accepted by the device, FIG. 7B shows the end 12 of the pipe pulled into the device, FIG. 7C shows pipe section 11' and coupler 13' removed from the pipe, and FIG. 7D shows the pipe with the pipe section and coupler stored.

Figure 7A:
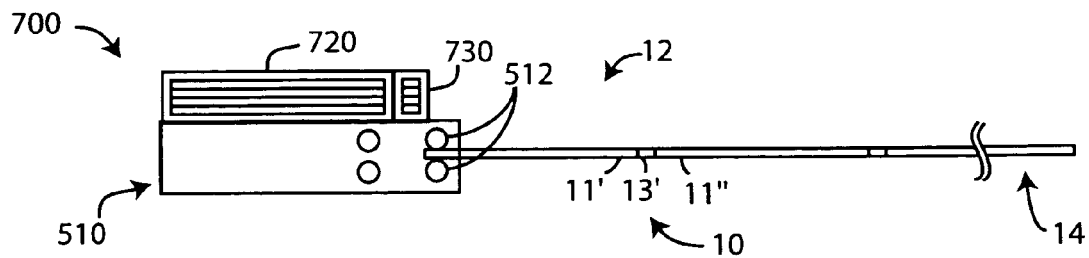
FIGS. 7A-7D are top, sequential views of a second alternative of the pipe manipulation device of FIGS. 5A and 5B disassembling irrigation pipe, where
Figure 7B:
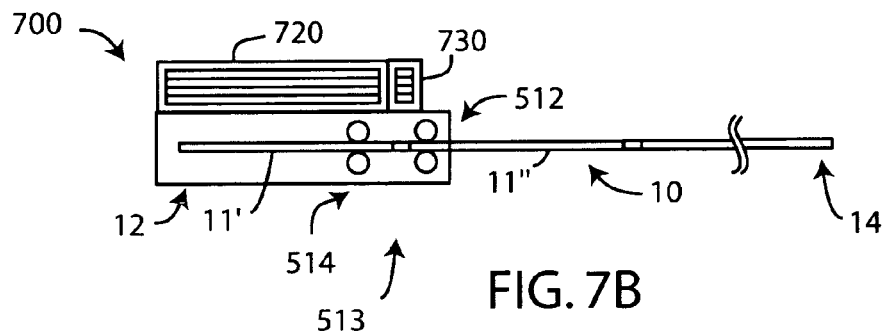

As shown in FIG. 7A, pipe 10 is positioned with end 12 within first mechanism 512 and end 14 distal from device 700. The reduction in the length of pipe 10 by the length of pipe segment 11' is shown in FIGS. 7B through 7D. As shown in FIG. 7B, pipe 10 is pulled into pipe drive mechanism 510 by the length of a pipe segment 11', positioning pipe coupler 13' within region 513. The force to move the pipe is supplied either with first mechanism 512 or alternatively with the assistance of second mechanism 514.

In one embodiment of the present invention, pipe 10 include risers, such as risers 5 or 125 that pass through first mechanism 512 without being damaged, preferably by orienting the riser to pass between traction elements of the first mechanism. With pipe 10 so situated, actions are taken to decouple the pipe and coupler. These actions may include, but are not limited to, depending on the pipe joining system used, a rotation about the longitudinal axis of the pipe or the actuating or placement of retaining pieces at the joint. For the pipe system of FIG. 13, decoupling includes the removal of a spline, such as one or both of splines 8a and 8b. To completely remove coupler 13', both splines are removed. To leave coupler 13' on pipe segment 11 or 11', the spline for joining the coupler to the other segment is removed.

Figure 7C:
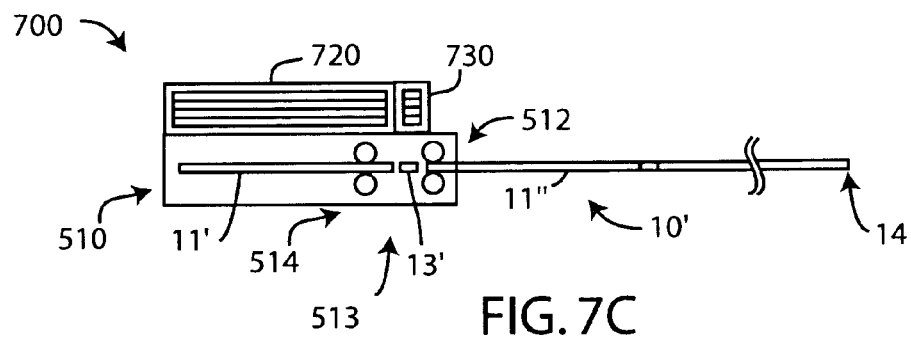
Figure 7D:
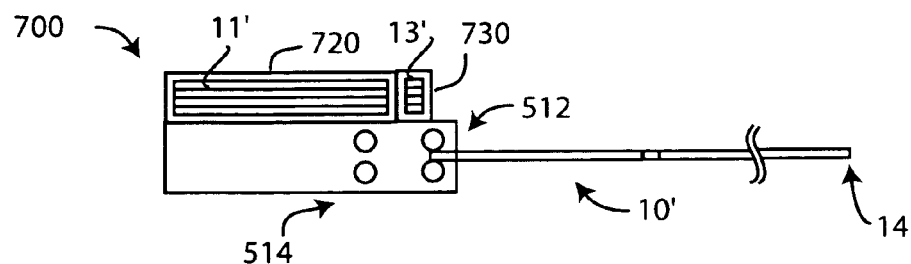

Next, as shown in FIG. 7C, pipe segments 11' and 11", and coupler 13' are taken apart. Specifically, pipe drive mechanism 510 imparts different longitudinal forces to pipe segments 11' and 11" to facilitate their disengagement and the shortening of pipe 10 to form pipe 10'. In one embodiment of the present invention, coupler 13 is removed from only one of the adjoining pipe segments 11 by second drive 514. In another embodiment of the present invention, pipe drive mechanism 510 includes a coupler handling mechanism that removably surrounds coupler 13' to hold it in place while segments 11' and 11" are pulled apart by the opposing forces of first and second mechanisms 512 and 514.

As shown in FIG. 7D, after segments 11' and coupler 13' are removed, segment 11' is placed in pipe carrier 720 and coupler 13' is placed or falls into in coupler carrier 730. Additional length of pipe is then removed by repeating the steps illustrated in FIGS. 7B-7D.

The methods illustrated in FIGS. 6 and 7 are illustrate and are not meant to limit the scope of the present invention. Thus for example, alternative embodiments include, but are not limited to, devices 500, 600 or 700 in which pipe segments or couplers are provided to drive mechanism 510 either manually or using feed mechanisms that are either manually operated or controlled by an automatic control system, and by devices that include additional mechanisms for performing other joining actions as required by specific piping systems. In another embodiment, the devices assemble or disassemble pipe segments having couplers attached. Thus for example, disassembly may leave a coupler on the end of each pipe. In yet another embodiment of the present invention, the couplers have risers and sprinkler heads attached.

Figure 8:
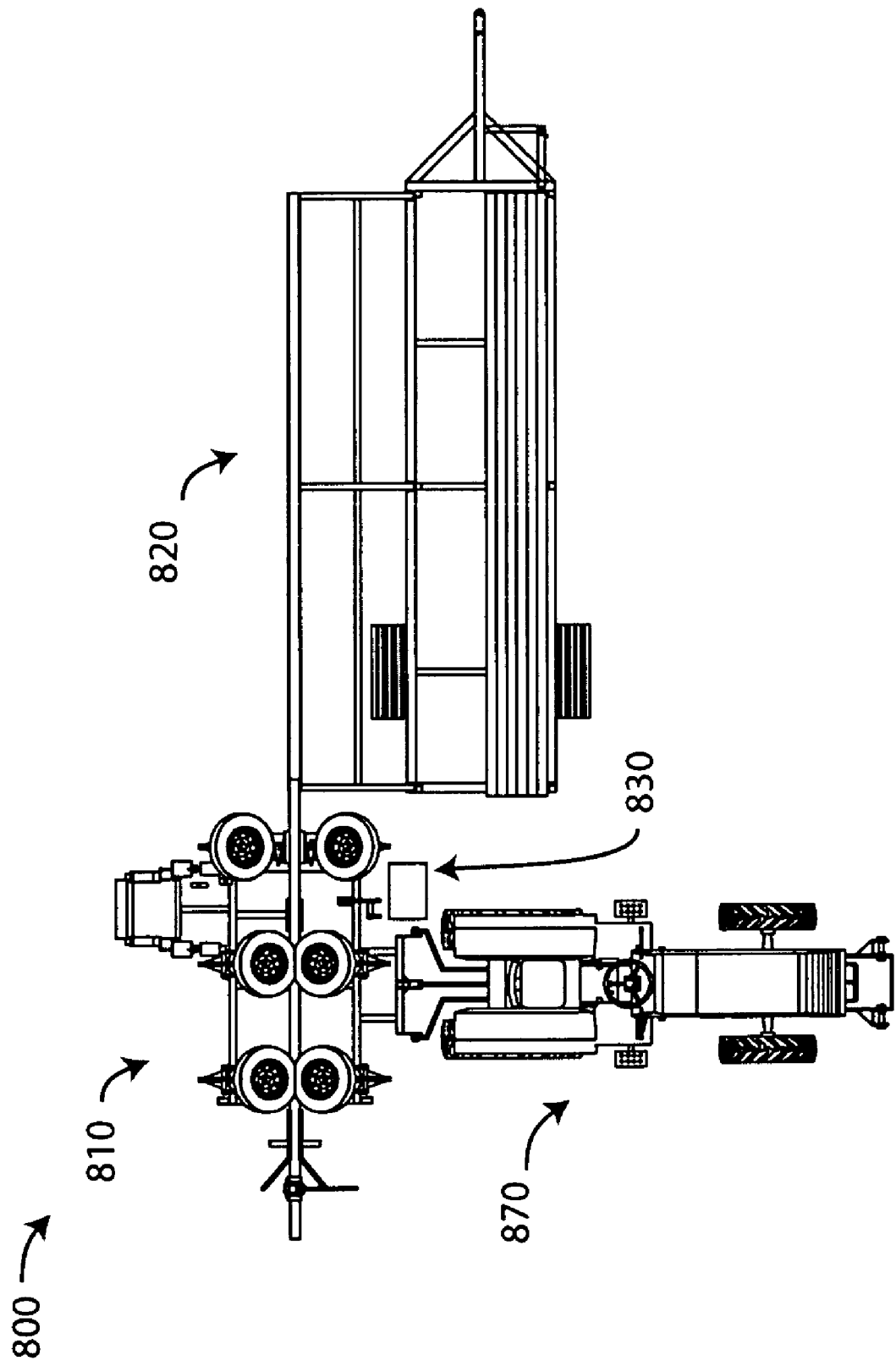
FIGS. 8-12 are several view of a second embodiment pipe manipulation device, where
Figure 9:
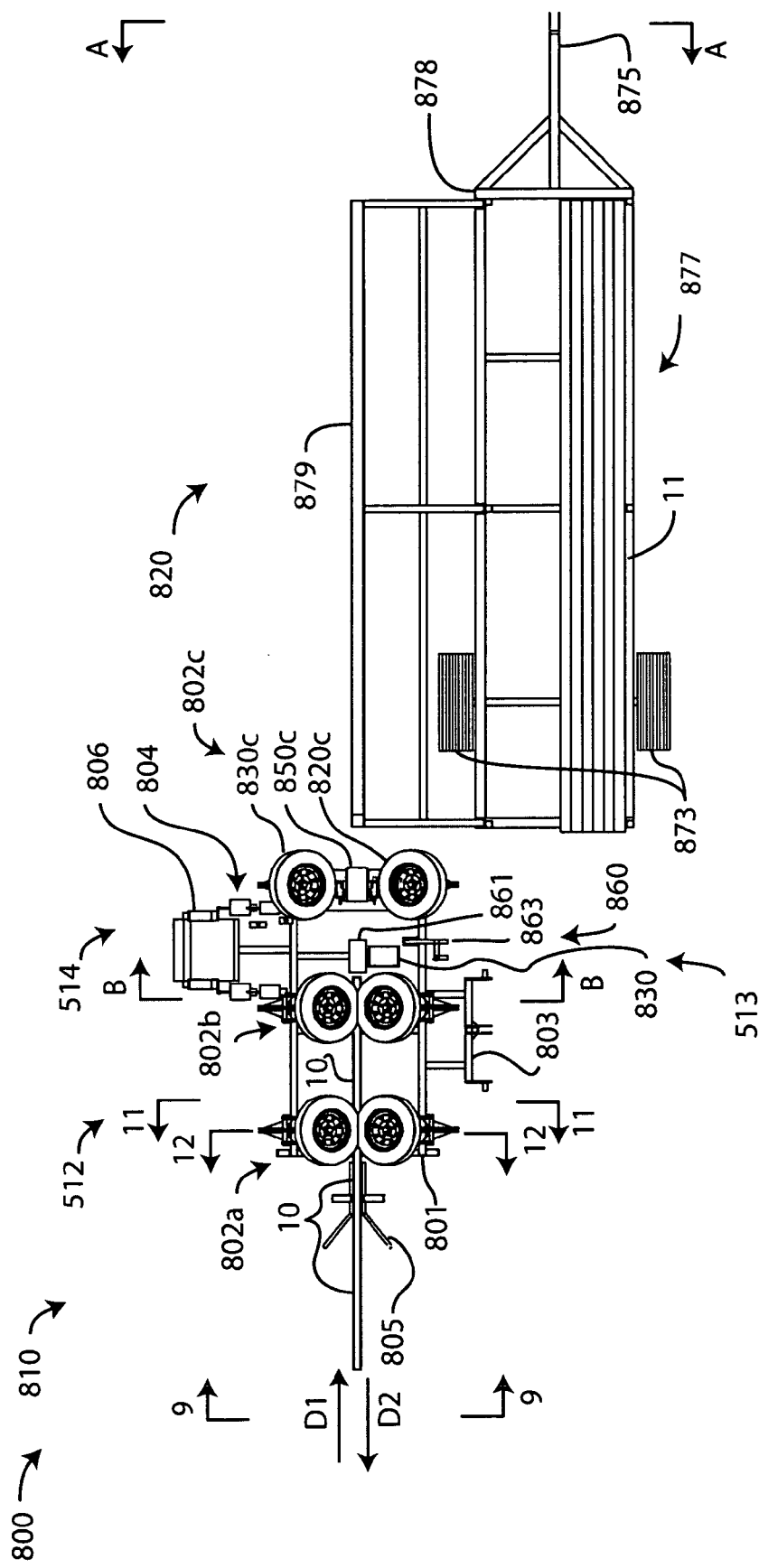
Figure 10:
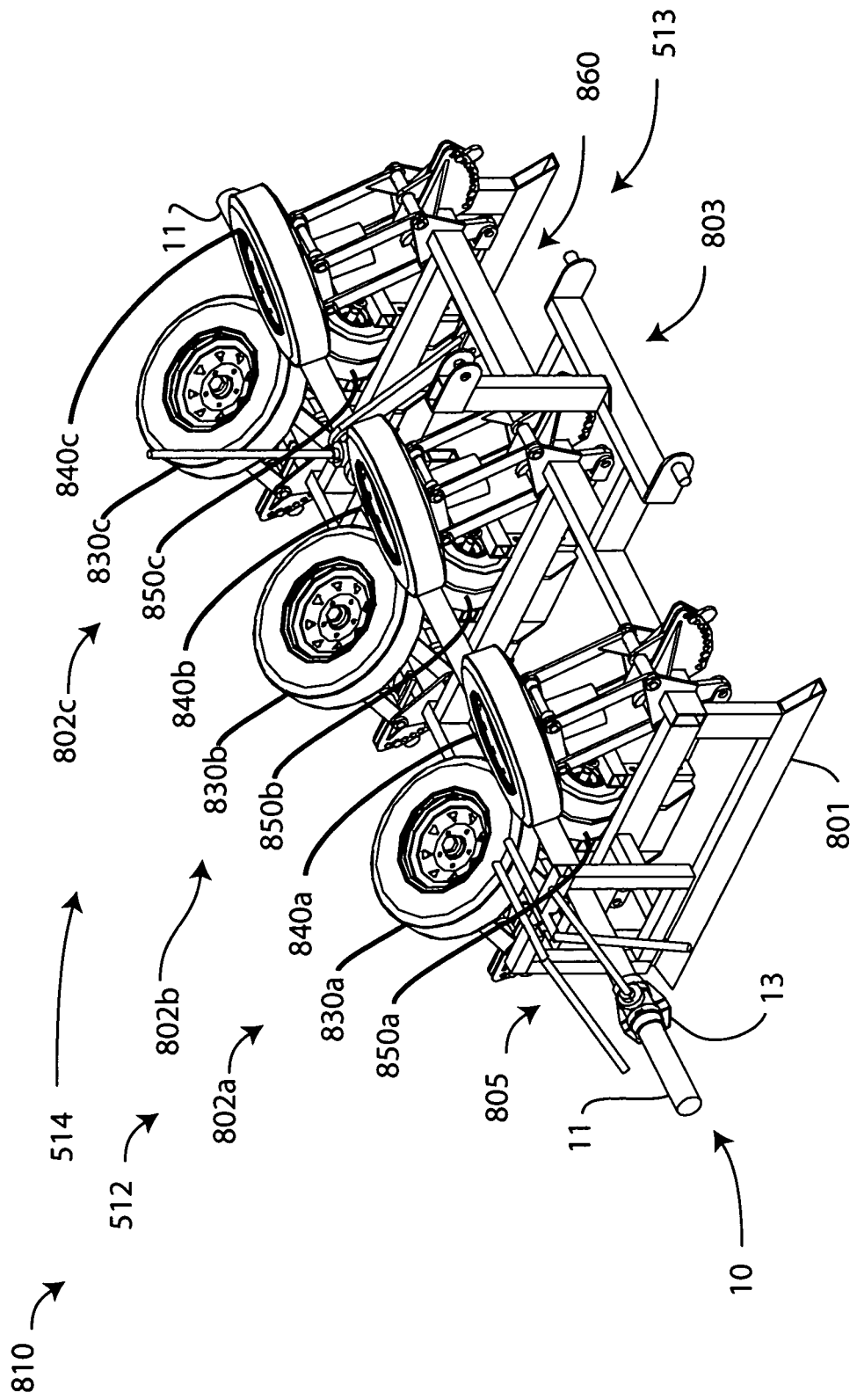
Figure 11:
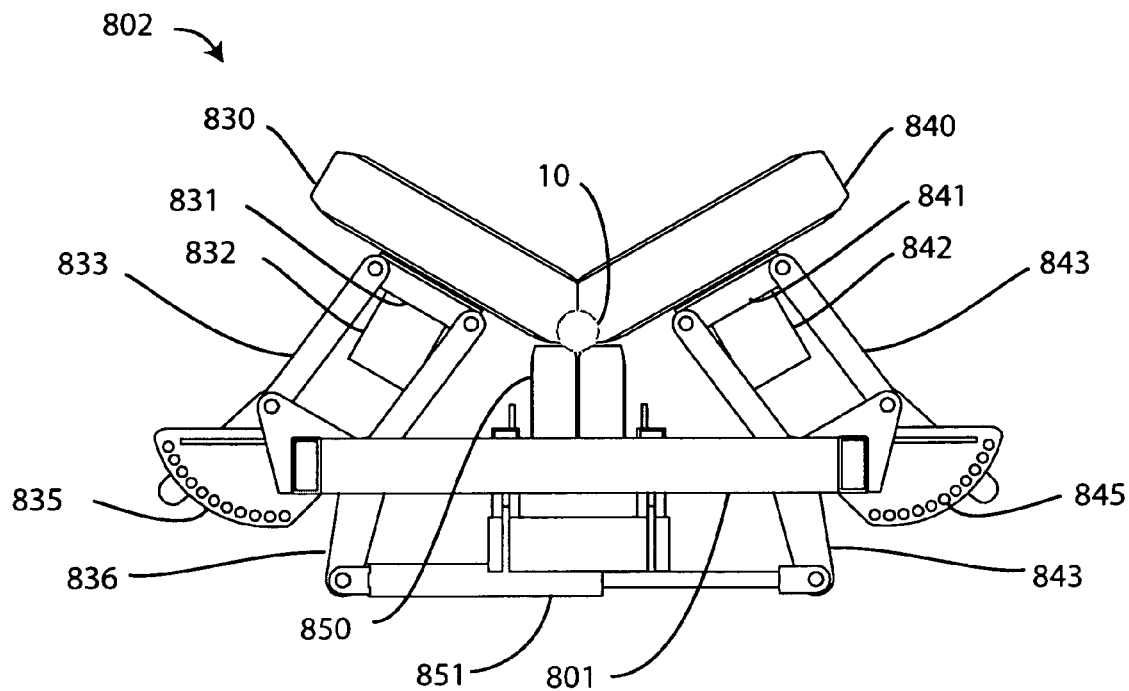
Figure 12:
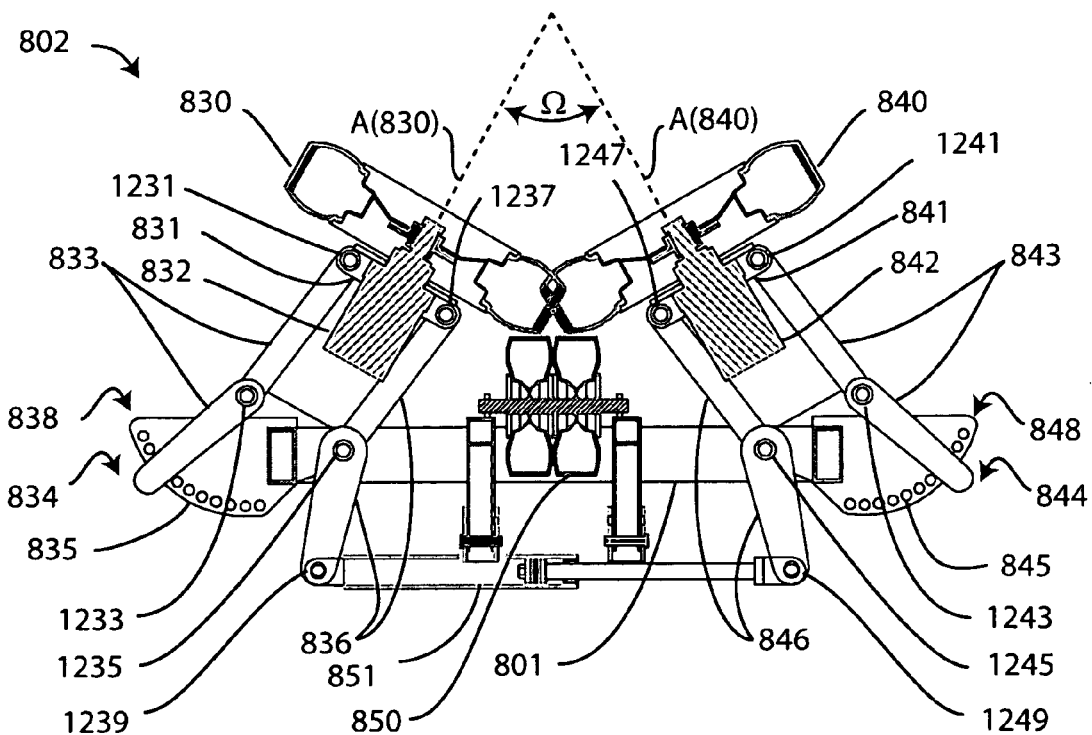

FIGS. 8-12 are several view of a second embodiment pipe manipulation device 800 including a pipe drive mechanism 810, a pipe carrier 820 and a coupler carrier 830, where FIG. 8 is a top view of the pipe drive mechanism including a coupler handling mechanism 860 and the pipe carrier, FIG. 9 is a side view 9-9 of FIG. 8, FIG. 10 is a perspective view of the pipe drive mechanism of FIG. 8, FIG. 11 is sectional view 11-11 of FIG. 8, and FIG. 12 is sectional view 12-12 of FIG. 8. Device 800 may be generally similar the device of FIGS. 5-7, and are, for example, generally similar to devices 500, 600 and 700 disclosed herein, except as further discussed below.

As shown in FIG. 8, device 800 is show in the vicinity of a tractor 870. Tractor 870 provides power, including but not limited to a supply of pressurized hydraulic fluid through hoses (not shown) for operating device 800. Alternatively, device 800 is a stand-alone system that includes a power source to operate the device.

FIG. 9 shows device 800 without tractor 870 to facilitate the discussion of device 800. Pipe drive mechanism 810 has a frame 801 adapted for resting on the ground, a three-point hitch 803 for movement by a tractor or other vehicle, support for three drives 802 indicated as a first drive 802a, a second drive 802b, and a third drive 802c, operating control levers 804, an operator's seat 806, and a coupler handling mechanism 860 within region 513. Each drive 802 includes a set of three wheels, indicated as wheels 830, 840, and 850 that may be driven or idle, as described subsequently. Frame 801 supports protrusions 805 that act to guide pipe into device 800 that may have a riser protruding transversely from pipe 10. Thus, for example, it is preferred that any riser be directed between wheels, such as between wheels 830 and 840, to minimize damage to the riser.

Pipe carrier 820 includes a pipe segment bin 877 having wheels 873 and a trailer hitch 875 for easy transport, and mechanisms for moving pipe segments between bin 877 and second mechanism 514. As shown in FIG. 8, a pipe tray 879 positioned longitudinally near second mechanism 514 to accept decoupled pipe and is mounted to bin 877 through hinges 878 that permit the pipe tray to rotate to place accepted pipe segments in bin 877.

Coupler handling mechanism 860 includes a coupler support 861 to support the weight of the pipe, and a coupler restraining arm 863 that is lowered over a coupler to prevent longitudinal motion of a coupler. Coupler carrier 830 is a bin positioned below coupler handling mechanism 860 to permit an operator to pick up a coupler and place it in the coupler handling and to allow decoupled couplers to drop into the bin.

In alternative embodiments, coupler handling mechanism 860 and coupler carrier 830 are not provided. Thus, for example, if there is no separate coupling member, that is, the pipe segments are coupled directly together, or if a separate coupler is left attached to a pipe segment, there may be no need to restrain the joint during decoupling or coupling.

FIGS. 9-13 illustrate drives 802. With reference to FIGS. 9 and 10, drives 802a, 802b and 802c are hydraulically-driven wheel drives that are longitudinally displaced along an accepted pipe 10 and controlled to impart longitudinal forces on a pipe 10 within the drives and provide the function of first mechanism 512 and second mechanism 514. Operating control levers 804 control hydraulic fluid or operating drives 802a, 802b, and 802c. Specifically, drives 802a and 802b are operated in unison as a first mechanism 512 to impart a longitudinal force in a first direction indicated as arrow D1 (in a direction from drive 802a to drive 802b) or in a second direction indicated as arrow D2 (in a direction from drive 802a to drive 802b), as shown in FIG. 8. Drive 802c is operated independently from drives 802a and 802b as second mechanism 514 to also impart a longitudinal force in either one of directions D1 or D2, or alternately to lock a pipe within drive 802c.

FIGS. 11 and 12 are side and sectional views, respectively, of drive 802a, where the components are indicated generally for each drive 802 without a corresponding letter "a," "b," or "c" on each reference numeral. Each element illustrated in FIGS. 11 and 12, with the exception of from 801, is present in three locations in pipe drive mechanism 810. Thus, for example, there are three sets of drive wheels 830 and 840 indicated in FIGS. 8-10: 830a and 840a for drive 802a, 830b and 840b for 802b, and 830a and 840b for drive 802c.

Each drive 802 includes a first wheel 830 and a second wheel 840. The position of wheels 830 and 840 are adjustable from a closed configuration to accept a pipe and provide traction to an open configuration where the wheels are moved apart. The side view of FIG. 11 shows a pipe 10 between wheels 830 and 840, and the sectional side view of FIG. 12 show drive 802 is a closed configuration with the wheels overlapping in the position that they would be without a pipe or the opposing wheel. In the closed configuration of FIGS. 11 and 12, the axis of wheels 830 and 840 are inclined relative to each other such that the axes meet at an angle Ω in the closed configuration. The angled wheel assembly, though not required, aids in the driving of pipe that may move laterally during motion. The angle Ω may, for example, be near zero, for parallel axis, or may up to 60 degrees. Each drive 802 also includes an idler wheel 850 supported on frame 801 that supports pipe 10 against pipe's weight and the transverse force from the inclined first and second wheel. As described subsequently, drive 802 includes mechanisms to adjust the wheels to accommodate a range of pipe diameters and a hydraulic piston to increase the force of wheels 830 and 840 on an accepted pipe 10 and to move the drive to an open configuration where the wheels are separated to allow, for example, a pipe to be removed transversely.

Drive 802 includes a pair of mirror image motors and linkages connected to frame 801 for adjusting the size of pipe that is driven, the force on the accepted pipe, and that also allows for disengagement of the drive. Specifically, first hydraulic motor 832 is mounted on a support 831 and adapted for driving first wheel 830. Support 831 is connected to frame 801 through a four-bar, adjustable linkage including a link 833 that is rotationally connected to support 831 at pivot 1231, a link 836 that is rotationally connected to support 831 at pivot 1237, and a plate 835 that is fixed to frame 801 and that is rotationally connected to link 833 at pivot 1233 and to link 836 at pivot 1235. An end 834 of link 833 includes a pin (not show) that engages one of holes 838 to adjustably connect link 833 to plate 835. In addition, second hydraulic motor 842 is each mounted on a support 841 and adapted for driving first wheel 840. Support 841 is connected to frame 801 through a four-bar, adjustable linkage including a link 843 that is rotationally connected to support 841 at pivot 1241, a link 846 that is rotationally connected to support 841 at pivot 1247, and a plate 845 that is fixed to frame 801 and that is rotationally connected to link 843 at pivot 1243 and to link 846 at pivot 1245. An end 844 of link 843 includes a pin (not show) that engages one of holes 848 to adjustably connect link 843 to plate 845. A hydraulic piston 851 is rotationally connected to link 836 at pivot 1239 and to link 846 at pivot 1249.

The angle Ω of the closed configuration of drive 802 is adjusted by the position of the pins in links 833 and 843 in holes 838 and 848, respectively, to allow for accommodating various pipe diameters. Thus, for example, engaging holes 838 and 848 that are further apart increases angle Ω and accommodates a smaller pipe, and engaging holes 838 and 848 that are closer together decreases angle Ω and accommodates a larger pipe. Increasing or extending the length of hydraulic cylinder 851 moves pivots 1239 and 1249 apart and thus increases the force on an accepted pipe. Decreasing, or contracting, the length of hydraulic cylinder 851 moves pivots 1239 and 1249 together, moving wheels 830 and 840 apart, and opening drive 802.

In one embodiment of the present invention, drive 802 accommodates pipes having a diameter of from approximately 1 inch to approximately 18 inches. In another embodiment, drive 802 accommodates pipes having a diameter of from approximately 3 inches to approximately 12 inches. In another embodiment, the transverse (compressive) force on an accepted pipe 10 is from about 1 to about 500 pounds. Wheels 830 and 840 are preferably solid rubber, semi-pneumatic, or pneumatic tires having a diameter of from 12 to 36 inches. In another embodiment, wheels 830 and 840 have a diameter of from 18 to 24 inches. Hydraulic motors 832 and 842 are preferably high-torque, low-speed motors, and can the type supplied by the Hydraulic Pump/Motor Division of Parker (Greeneville, Tenn.).

Alternatively, one or more drive 802 may include springs or other tensioning devices, may include other traction devices, including locking mechanisms, and not include variable spacing to accommodate a variety of pipe sizes. Additionally, drive 802 may include additional mechanisms for assembly or disassembly of piping, including, but not limited to, turning, threading, welding or gluing to form a continuous pipe.

Figure 26:
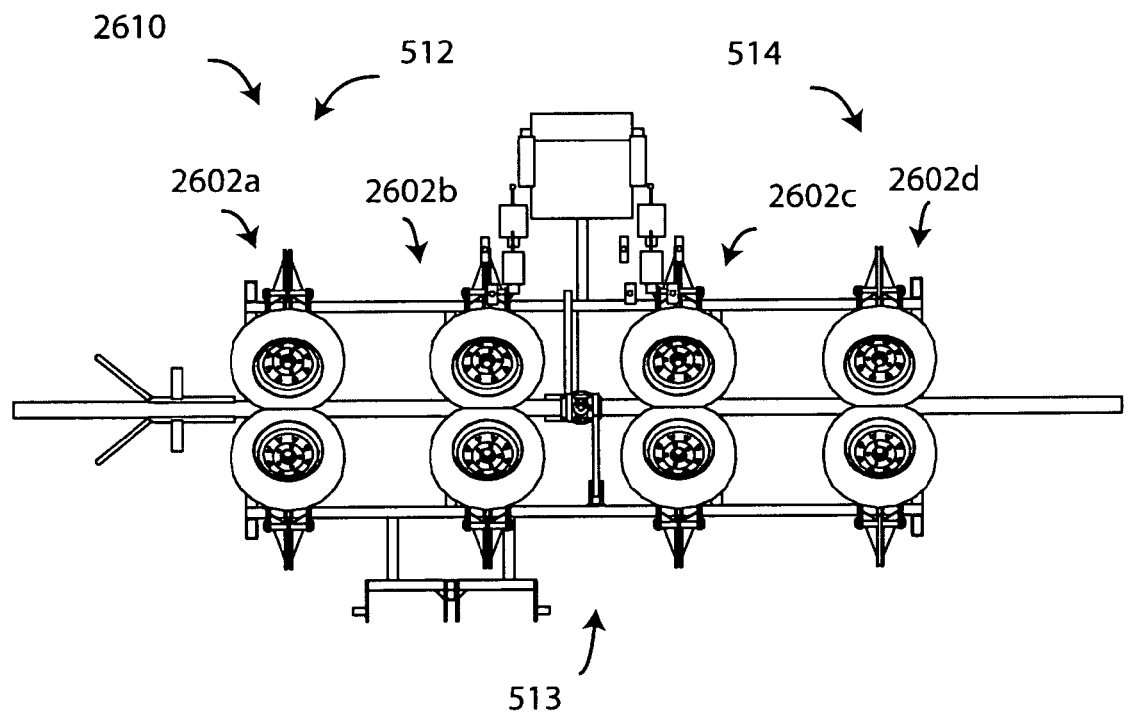
FIG. 26 is a top view of an first alternative pipe drive mechanism having four drives.
Figure 27:
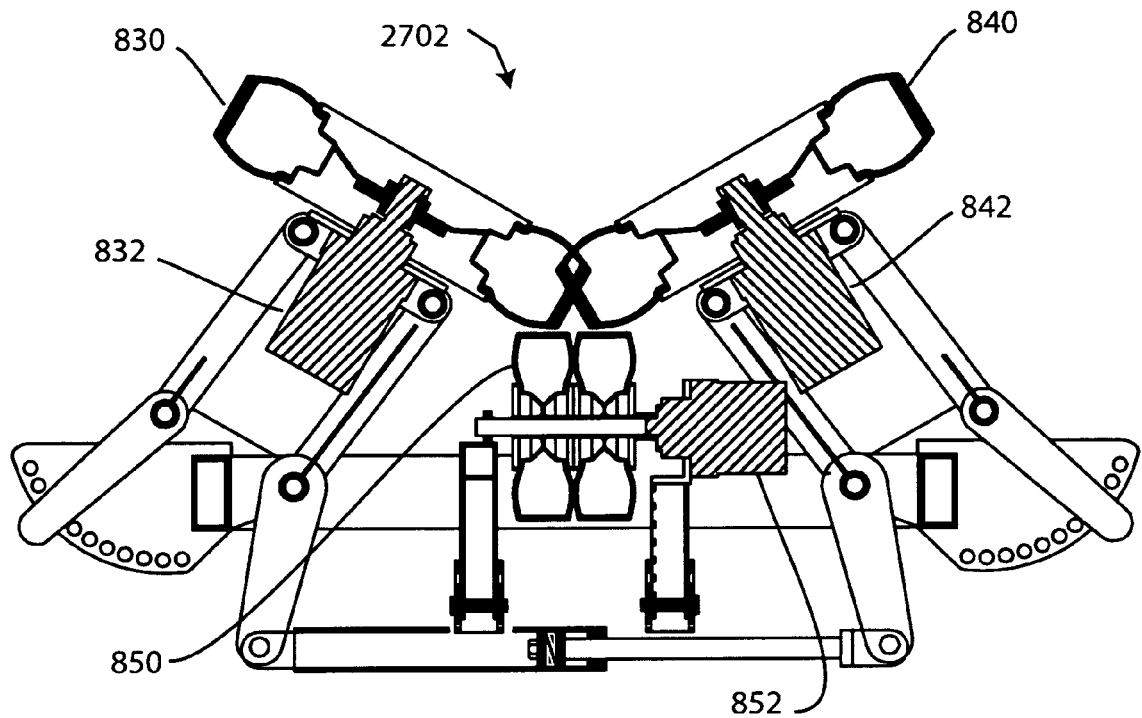
FIG. 27 is a sectional view 12-12 of a second alternative drive mechanism with three sets of drive wheels.
Figure 28:
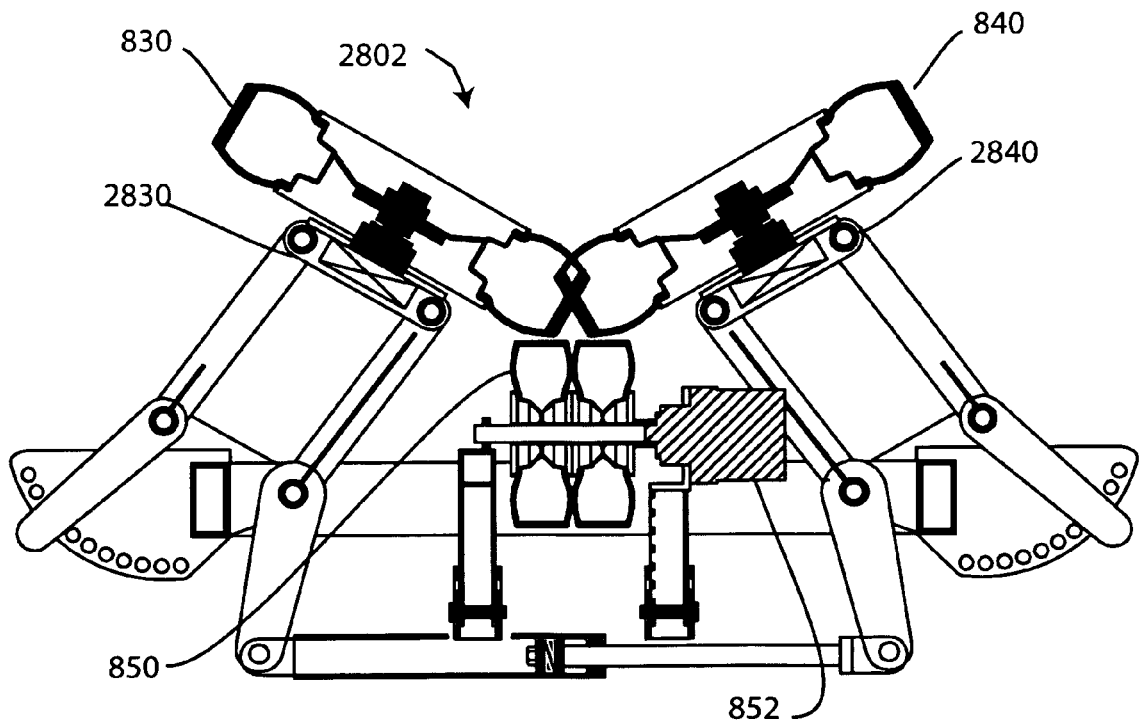
FIG. 28 is a sectional view 12-12 of a third alternative drive mechanism having one lower drive wheel and two upper idler wheels.

Several additional embodiments of the pipe drive mechanism are shown in FIGS. 26-28. FIG. 26 is a top view of an first alternative pipe drive mechanism 2610 having four drives 2602, specifically drives 2602a, 2602b, 2602c and 2602d. Pipe drive mechanism 2610 may be generally similar the device of FIGS. 8-12, and is, for example, generally similar to drive 810 disclosed herein, except as further discussed below.

Drives 2602a, 2602b, 2602c and 2602d include hydraulically-driven wheel drives that are longitudinally displaced along an accepted pipe 10 and controlled to impart longitudinal forces on a pipe 10 within the drives. Device 2610 differs from device 810 in that each mechanism 512, 514 has two drives. The control of drives 2602 provides coordinated control between pairs of drives, such that drives 2602a and 2602b form first mechanism 512 and drives 2602c and 2602d form second mechanism 514. More specifically, operating control levers 804 control hydraulic fluid or operating drives 2602a, 2602b, 2602c and 2602d. Drives 2602a and 2602b are operated in unison as a first mechanism 512 to impart a longitudinal force in a first direction, from drive 2602a to drive 2602d, or in a second direction from drive 2602a to drive 2602d. Drives 2602c and 2602d are operated in unison and independently from drives 2602a and 2602b as second mechanism 514 to also impart a longitudinal force in either one of the longitudinal directions, or alternately to lock a pipe.

Since pipe drive mechanism 2610 is symmetric, with two drives on either side of region 513, the mechanism is reversible, allowing for pushing or pulling of pipe on either end of the mechanisms, for any of the methods described herein. Mechanism 2610 thus allows for assembling and disassembling on either side. This is particularly useful for solid-set layouts as illustrated in FIG. 1, where lateral lines 120 emanate from both sides of main line 110. For such layouts, mechanism 2610 need not be turned around to assemble or disassemble on opposites of the main line.

FIG. 27 is a sectional view 12-12 of a drive mechanism 2702 which may be generally similar the device of FIGS. 8-12, and is, for example, generally similar to drive 802 disclosed herein, except as further discussed below. Specifically, drive mechanism 2702 has three drive wheels and includes a motor 852 that drives wheel 850. Specifically, wheels 830, 840, and 850 are driven by motors 832, 842, and 852, respectively.

FIG. 28 is a sectional view 12-12 of a drive mechanism 2802 which may be generally similar the device of FIGS. 8-12, and is, for example, generally similar to drive 802 disclosed herein, except as further discussed below. Specifically, drive mechanism 2802 has one drive wheel and two idling wheels. Wheels 830 and 840 are mounted to freely rotate on mounting 2830 and 2840, respectively. Wheel 850 is mounted on motor 852 that drives that wheel.

While pipe drive mechanisms 810 and 2610 have been described as having similar drives 802, it is within the scope to vary the drives. Thus for example, any combination of drives, including but not limited to combinations of drives 802, 2702 or 2802 may be provided to provide a longitudinal force power any of the mechanisms. Thus for example, with reference to FIG. 9, one embodiment of the present invention may have drive a drive 802 at the position of drive 802a, have a drive 2702 in place of drive 802b, and may have a drive 2802 in place of drive 802c. In addition, other mechanisms for varying the tension of the drive on an accepted pipe, of adjusting the drive to accept different diameter pipes, and for opening and closing the drives are within the scope of the present invention.

Figure 18A:
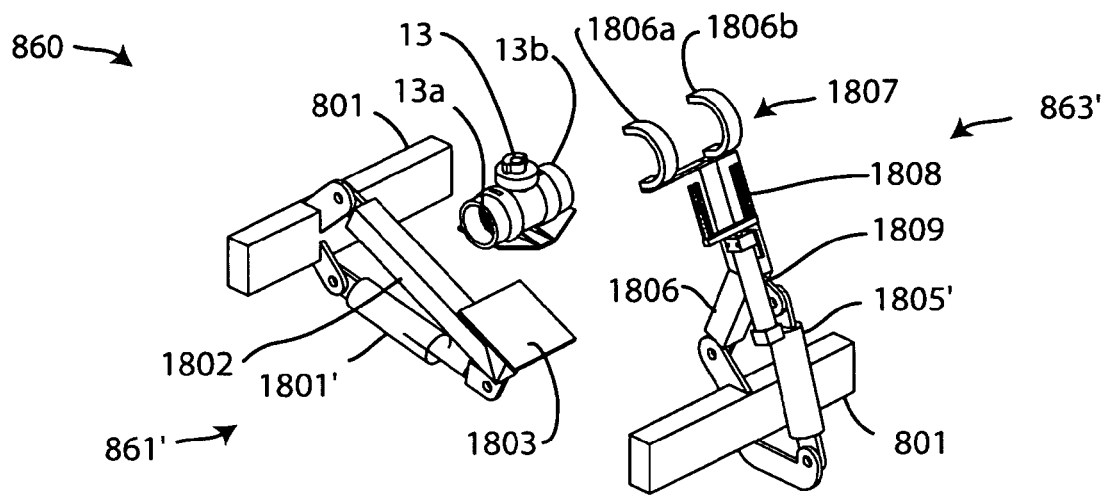
FIG. 18A is a perspective view of one embodiment pipe coupler handler in an open configuration.
Figure 18B:
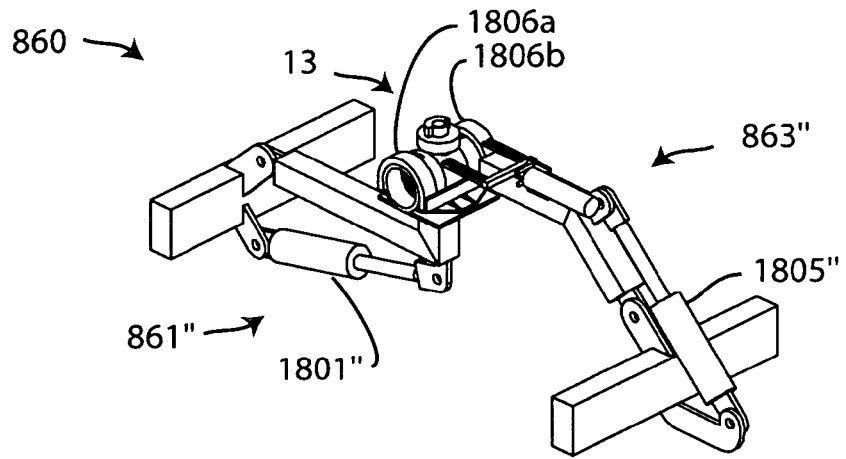
FIGS. 18B and 18C are a perspective and side view, respectively, of one embodiment pipe coupler handling mechanism in a closed configuration.
Figure 18C:
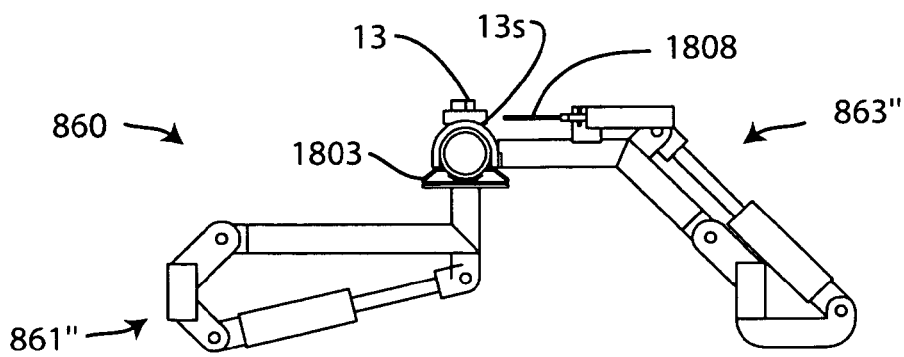

FIG. 18A is a perspective view of one embodiment pipe coupler handler 860 in a first configuration, and FIG. 18B and 18C are a perspective and side view, respectively, of mechanism 860 in a second configuration. FIGS. 18A-18C also show a coupler 13 that is part of a pipe 10, which is not shown in FIG. 18. That is, the position of coupler 13 in FIGS. 18A-18C is that position that a coupler occupies as a pipe travels through device 800, and is the position at which handler 860 is adapted for working on an accepted coupler 13.

Pipe coupler handling mechanism 860 includes coupler support 861 having a hydraulic cylinder 1801 an a link 1802 that connects frame 801 to a platform 1803, and coupler restraining arm 863 includes a hydraulic cylinder 1805 and a link 1806 that connects the frame to a clamp 1807 that includes a pair of prongs 1807a and 1807b fixed to link 1806. Coupler restraining arm 863 also includes a tool 1809 having a grippers 1808 for pulling one or more splines adapted for joining coupler 13 to adjacent and inserted pipe segments, including but not limited to spline 8.

Hydraulic cylinder 1801 is movable, under the action of hydraulic fluid from a first configuration indicated as cylinder 1801' in FIG. 18A to a longer configuration indicated as cylinder 1801" in FIGS. 18B and 18C. The increase in length from cylinder 1801' to cylinder 1801" moves coupler support 861 from a first position, indicated as support 861' to a second position, indicated as support 861". Hydraulic cylinder 1805 is movable, under the action of hydraulic fluid from a first configuration indicated as cylinder 1805' in FIG. 18A to a longer configuration indicated as cylinder 1805" in FIGS. 18B and 18C. The increase in length from cylinder 1805' to cylinder 18051" moves arm 863 from a first position, indicated as arm 863' to a second position, indicated as arm 863". Cylinders 1801 and 1805 are independently controllable, either through manual valves or through a control system. Additionally, a spline insertion tool may be incorporated into mechanism 860.

The spacing of prongs 1807a, 1807b is such that clamp 1807 fits, for example, about a riser that is midway between the ends of the clamp. Arm 863" also aligns tool 1809 so that grippers 1808 can pull one or more splines. In an alternative embodiment, gripper 1808 grabs and releases either one spline or is controllable to remove either spline, one at a time.

Figure 13:
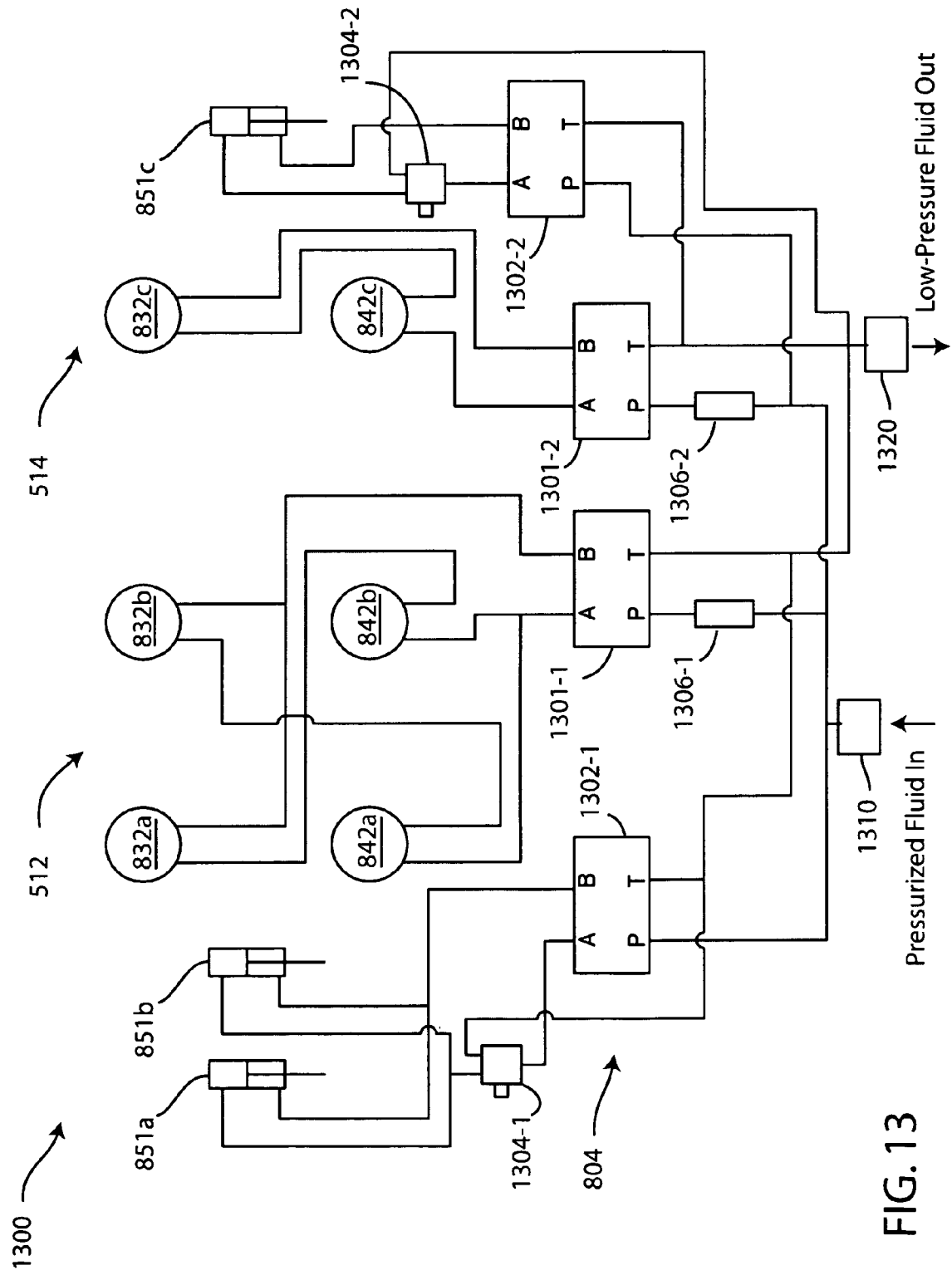
FIG. 13 is a schematic of a portion of the hydraulic system of the pipe manipulation device of FIGS. 8-12.

FIG. 13 is a schematic of a portion of the hydraulic system 1300 of the pipe manipulation device of FIGS. 8-12. Actuation of system 1300 results in wheels 830 and 840 providing the operation of first mechanism 512 and second mechanism 514. System 1300 includes a first coupler 1310 allowing the system to receive pressurized hydraulic fluid from source, such as a nearby tractor, and a second coupler 1320 allowing for the discharge of hydraulic fluid. Hydraulic fluid is directed by valves 804, including a first and second 4-way, 3-position, spring center directional control valves 1302-1 and 1301-2, respectively and a first and second 4-way, 3-position, directional control valves 1302-1 and 1302-2. The valved fluid is directed through pressure reducing relive valves 1304-1 and 1304-2 to the cylinders to apply the correct force on the wheels, and flow control valves 1306-1 and 1306-2 which control the speed of hydraulic drive motors 832a, 842a, 832b, 842b, 832c, and 842c and actuate hydraulic cylinders 851a, 851b, and 851c.

Valve 1301-1 controllably directs the flow of hydraulic fluid from A to B, as indicated on the valve, to rotate motors 832a, 842a, 832b, and 842b in one direction, from B to A to rotate motors 832a, 842a, 832b, and 842b in an opposite direction, or to lock motors 832a, 842a, 832b, and 842b. Valve 1302-1 controllably directs the flow of hydraulic fluid from A to B to open or close hydraulic cylinders 851a and 851b, and valve 1304-1 provides a setting for a maximum closing force on the hydraulic cylinders 851a and 851b. Valve 1301-2 controllably directs the flow from A to B, as indicated on the valve, to rotate motors 832c and 842c in one direction, from B to A to rotate motors 832*c*, and 842*c* in an opposite direction, or to lock motors 832*c* and 842*c*. Valve 1302-2 controllably directs the flow of hydraulic fluid from A to B to open or close hydraulic cylinders 851*c*, and valve 1304-2 provides a setting for a maximum closing force on the hydraulic cylinders 851*c* and 851*b*. Valves 1301-1, 1302-1, and 1304-1 thus control wheels 830*a*, 840*a*, 830*b*, and 830*b* to provide the action of first mechanism 512, and valves 1301-2, 1302-2, and 1304-2 control wheels 830*c* and 840*c*, 830*b*, and 830*b* to provide the action of first mechanism 514.

Alternative embodiments of system 1300 are adaptable to other pipe drive mechanisms or drives, for example by providing hydraulics to control a different number of wheels, as in drives 2702 or 2802. Alternatively, additional hydraulics is required for additional drives. Thus for example, pipe drive mechanism 2600 requires four drives, and thus an additional set of hydraulic for drives 802*d* that mirrors the hydraulics of drives 802*a* and 802*b*. In addition, mechanism 2600 is symmetric and thus reversible. In one embodiment of the present invention, the alternative embodiment of system 1300 for mechanism 2600 includes a lever to direct the assembly and disassembly actions from one side of the mechanism or the other.

Many embodiments of mechanisms 512 and 514 are within the scope of the present invention in addition to those discussed above. Thus, for example, each mechanism may include individual drives having two wheels or four or more wheels. The wheels can be driven in different combinations. Thus, for example, wheels 850 can be driven with one or both of wheels 830 and 840 idling or all of the wheels can be driven. Mechanisms 512 and 514 can each include one, two, or more sets of longitudinally spaced wheels.

Figure 14A:
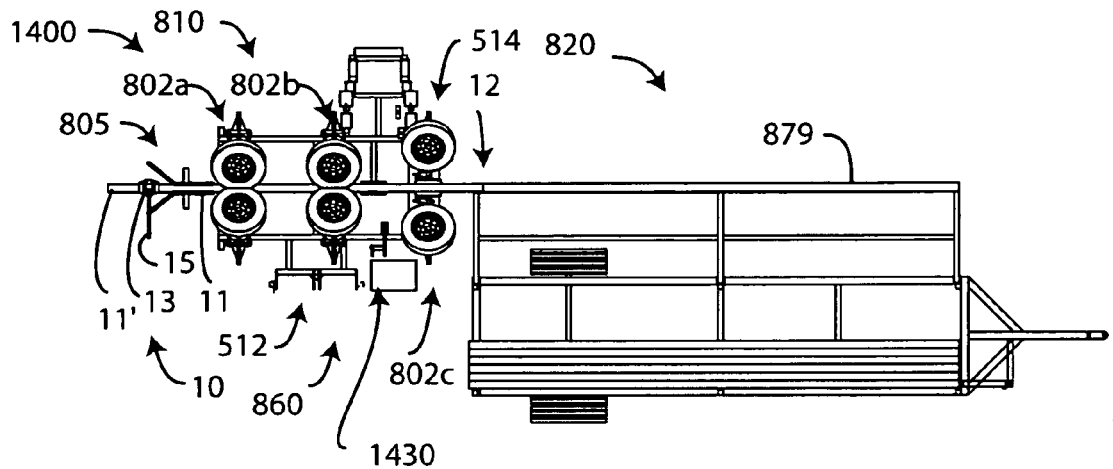
FIGS. 14A-14C, 15A-15E, 16A-16B, and 17 are sequential views of a first alternative pipe manipulation device of FIG. 8 disassembling pipe, where
Figure 14B:
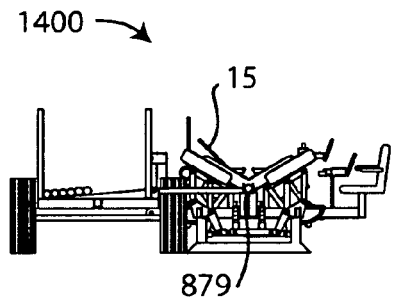
Figure 14C:
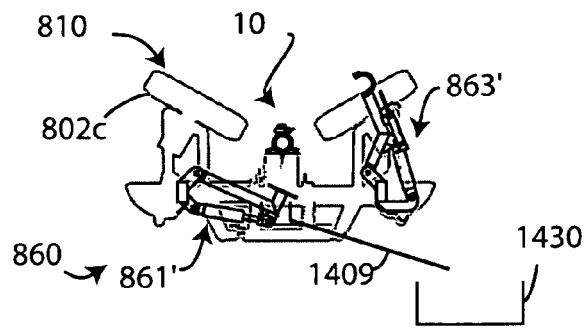
Figure 15A:
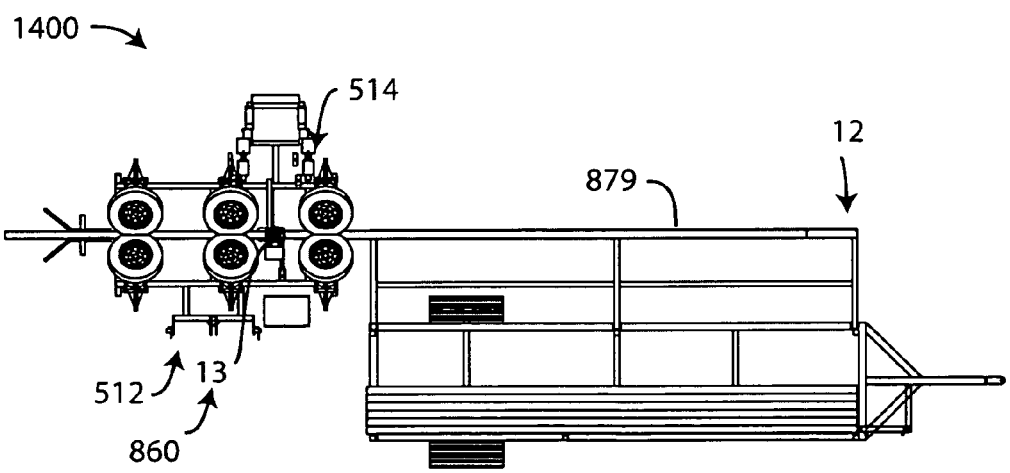
Figure 15B:
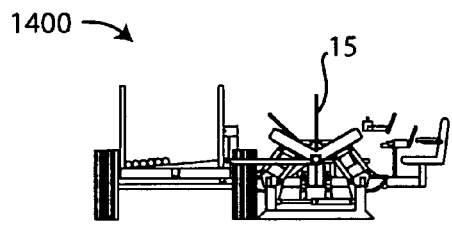
Figure 15C:
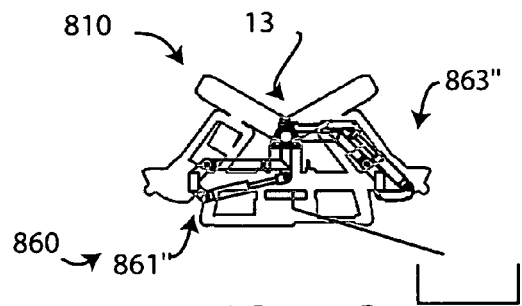
Figure 15D:
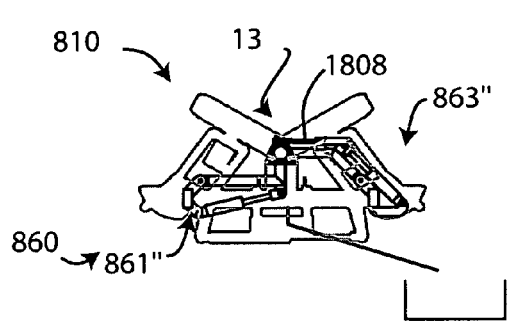
Figure 15E:
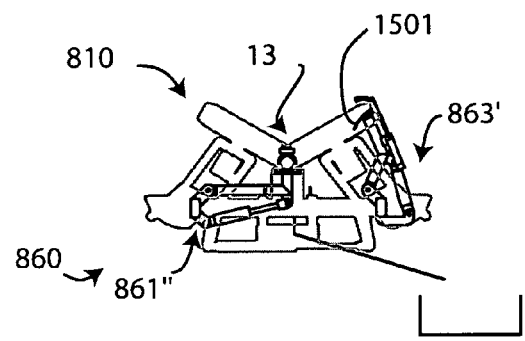
Figure 16A:
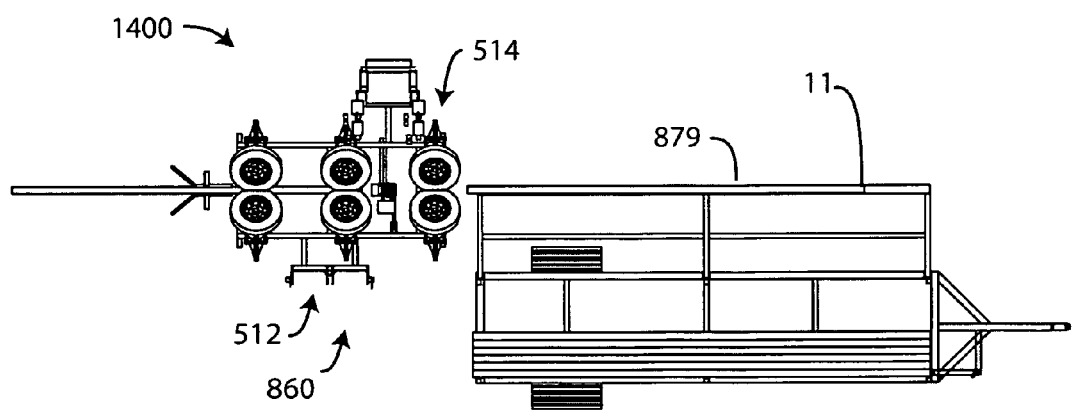
Figure 16B:
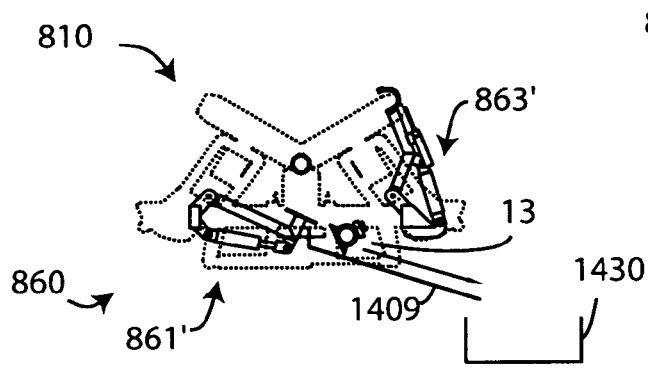
Figure 17:
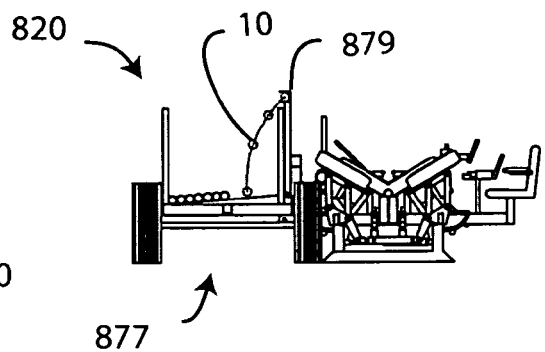

FIGS. 14A-14C, 15A-15E, 16A-16B, and 17 as sequential views of a first alternative embodiment of 800 as pipe manipulation device 1400 disassembling pipe, where FIGS. 14A, 14B, and 14C are a top, side, and sectional side view 14C-14C of FIG. 14A of the device accepting the end of a pipe, FIGS. 15A, 15B, 15C, 15D, and 15E are a top, side, and sectional side views 14C-14C, 14D-14D, and 14E-14E, respectively, of FIG. 15A of the coupler handling mechanism restraining the coupler, FIGS. 16A and 16B are a top and sectional side view 16B-16B of FIG. 16A of a disassembled pipe segment separated from the pipe, and FIG. 17 is a side view of the pipe segment being moved by the pipe carrier, Device 1400, including pipe drive mechanism 810, pipe carrier 820 and coupler carrier or bin 1430, is useful for assembly or disassembly of pipe, or is configured for only for disassembly of pipe. Device 1400 may be generally similar the device of FIGS. 5, 7 and 8, and are, for example, generally similar to devices 500, 700, and 800 disclosed herein, except as further discussed below.

Device 1400 is used to disassemble a length of pipe 10 by removing one or more pipe segments 11. Drives 802*a* and 802*b* are shown in a closed configuration, that is with cylinder 851*a* and 851*b* extended, and drive 802*c* is shown in an open configuration, with cylinder 851*c* contracted. For illustrative purposes, the pipe section at end 12 is denoted as pipe section 11', which is joined by pipe coupler 13' to a pipe section 11". FIGS. 14A-14C shows pipe 10 accepted by pipe drive mechanism 810 with first mechanism 512 engaging the pipe and translating it towards second mechanism 514, with second mechanism disengaged, and with end 12 protruding to pipe tray 879. In addition, the coupler handling mechanism is an open configuration of support 861' and arm 863'. FIG. 14B shows pipe 10 being accepted with an attached riser 15 entering between protrusions 805. FIG. 14C shows coupler support 861' and coupler restraining arm 863' positioned to allow pipe to travel unimpeded through coupler handling mechanism 860 and a chute 1409 that extends from the position of platform 1803 as shown in FIG. 14C to coupler bin or carrier 1430.

FIGS. 15A-15E shows pipe 10 with mechanism 512, 514 locked to prevent lateral movement of the pipe. The hydraulics of coupler handling mechanism 860 has been actuated such that coupler 13 is positioned at coupler handling mechanism 860. FIG. 15B shows riser 15 protruding vertically. Cylinders 1801 and 1805 are then actuated to clamp coupler 13, as shown in FIG. 15C as coupler support 861" and coupler restraining arm 863". As shown in FIG. 15D, gripper 1808 is next placed against and engages the ends of the splines of coupler 13. Next, as shown in FIG. 15E, coupler restraining arm 863 is moved to the position of arm 863', thereby pulling splines 1501 from coupler 13 and decoupling pipe segment 11 from the coupler.

Next, as shown in FIGS. 16A-16B, second mechanism 514 is activated to eject segment 11 into pipe tray 879. In addition, with coupler 13 disengaged from pipe 10 and pipe segment 11, it can now be separated from these components. Specifically, coupler support 863 is lowered into the position of support 861', allowing coupler 13 to slide off of platform 1803, down chute 1409 and into bin 1430. Next, as shown in FIG. 17, pipe segment 11 is lifted with pipe tray 879 into bin 877.

Figure 19A:
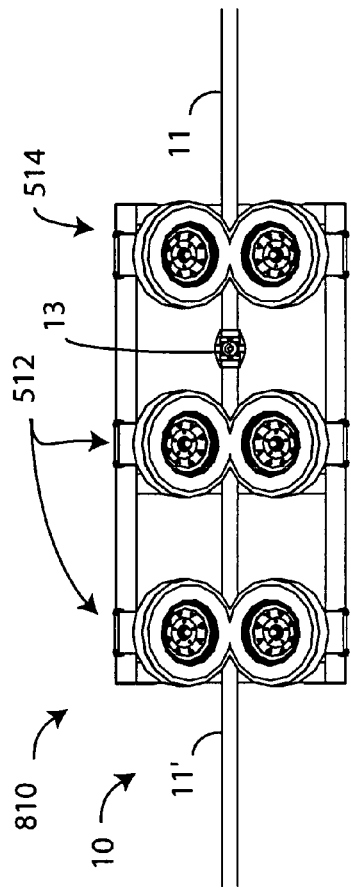
FIGS. 19A, 19B and 19C are sequential top views the pipe drive mechanism for an alternative decoupling method.
Figure 19B:
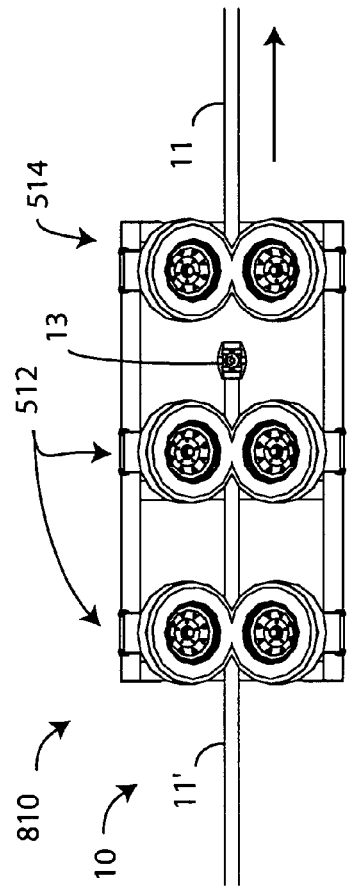
Figure 19C:
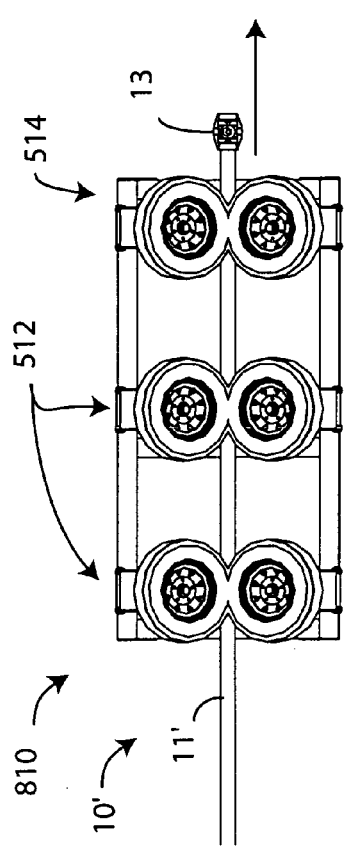

An alternative method of decoupling pipe is illustrated in FIGS. 19 and 20. FIGS. 19A-19C are sequential top views the pipe drive mechanism for an alternative decoupling method that keeps the coupler attached to a pipe segment. In FIG. 19A, a pipe 10 having, sequentially, an end pipe segment 11, a coupler 13, and a pipe segment 11' is accepted in to pipe drive mechanism 810 with coupler 13 between first mechanism 512 and second mechanism 514. Next, as shown in FIG. 19B, the spline coupling coupler 13 to pipe segment 11 is then removed, and, with first mechanism 512 restraining pipe segment 11', second mechanism 514 forces pipe segment 11 from pipe drive mechanism 810, as indicated by the arrow. Then, as shown in FIG. 19C, one or both of mechanisms 512 and 514 are then used to force the remaining pipe 10' through mechanism 810.

FIGS. 20A-20D are sequential top views the pipe drive mechanism for a second alternative decoupling method to separate a coupler from adjoining pipe segments without a coupler handling mechanism, such as without mechanism 860. First, as shown In FIG. 20A, a pipe 10 having, sequentially, an end pipe segment 11, a coupler 13, and a pipe segment 11' is accepted in to pipe drive mechanism 810 with coupler 13 between first mechanism 512 and second mechanism 514. Next, as shown in FIG. 20B, the spline coupling coupler 13 to pipe segment 11 is then removed, and, with first mechanism 512 restraining pipe segment 11', second mechanism 514 forces pipe segment 11 from pipe drive mechanism 810, as indicated by the arrow. The other spline is then removed from coupler 13, and then, as shown in FIG. 20C, the pipe is advanced such that the coupler is engaged in second mechanism 514. The next step is to restrain pipe segment 11' with first mechanism 512 and force coupler from pipe segment 11' by activating second mechanism 514, as shown by the arrow.

Figure 21:
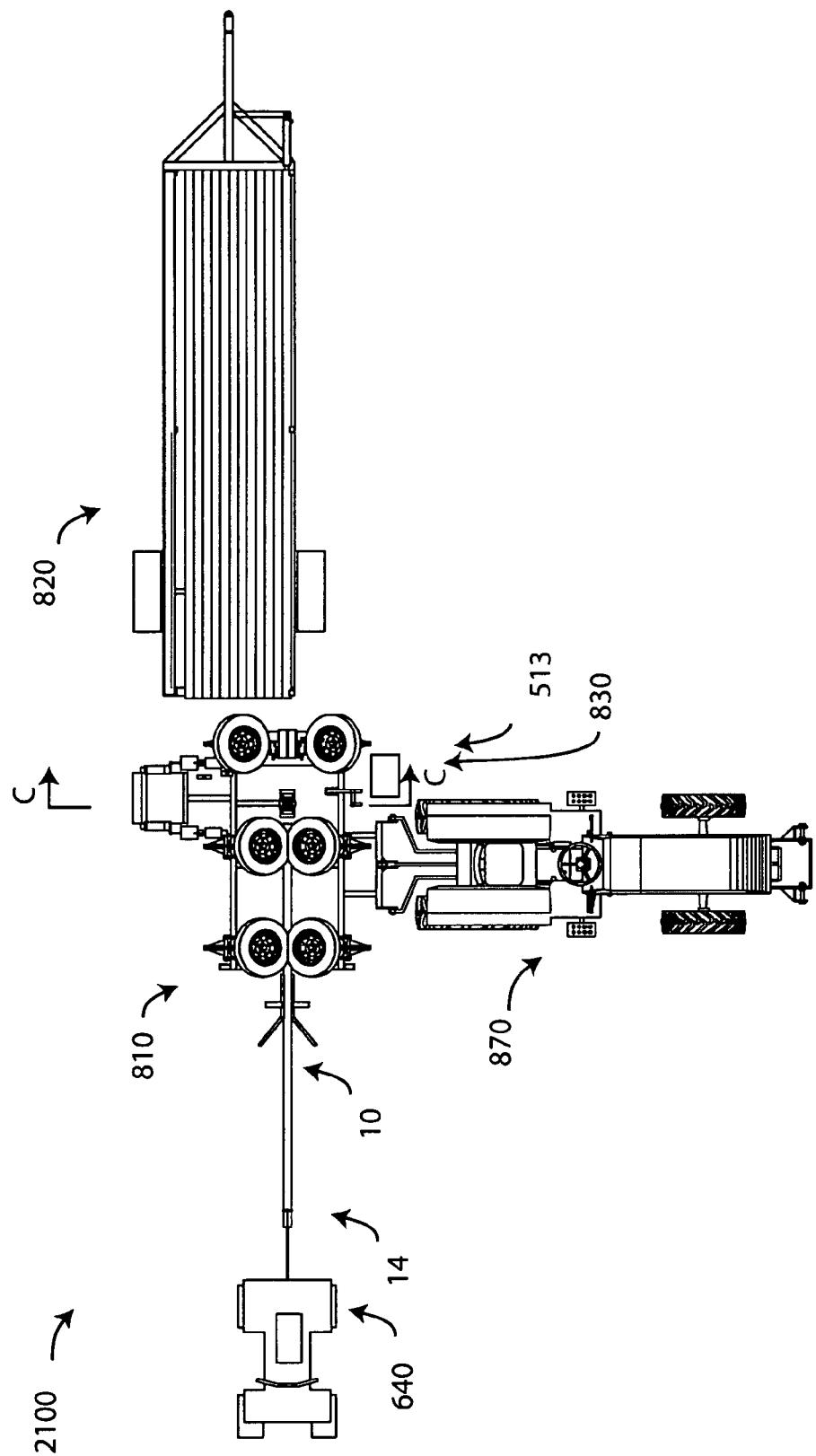
FIG. 21 is a top view of a second alternative pipe manipulation device of FIG. 8.

FIG. 21 is a top view of a second alternative embodiment of device 800 as a pipe manipulation device 2100. Device 2100, including pipe drive mechanism 810 and pipe carrier 820 is useful for assembly or disassembly of pipe, or is configured for only for assembly of pipe. Device 2100 may be generally similar the device of FIGS. 5, 6, 8, and 14 and are, for example, generally similar to devices 500, 600, 800, and 1400 disclosed herein, except as further discussed below.

As shown in FIG. 21, device 2100 includes a pipe drive mechanism 810, a pipe carrier 820 and a coupler carrier 830. A tractor 870 is shown attached to pipe drive mechanism 810. Importantly, tractor 870 provides power, including but not limited to a supply of pressurized hydraulic fluid through hoses (not shown) for operating device 800. Alternatively, device 2100 is a stand-alone system that includes a power source to operate the device. Pipe 10 is assembled from a fixed location in the field with an end 14 that is provided to the surrounding area. As shown in FIG. 21, a vehicle 640 is attached to end 14 and pulls pipe away from device 2100.

Several methods of using device 2100 are shown in FIGS. 22-25 as sequential top and sectional views, respectively, of an alternative pipe manipulation device 2100 assembling pipe. In FIGS. 22-25 the tractor 870 and vehicle 640 are shown to more clearly illustrate the invention. FIGS. 22A, 22B, and 22C are a top view, a side view C-C of FIG. 21, and a top detail views, respectively, of the device accepting a coupling, FIGS. 23A and 23B are a top view and a side views C-C, respectively, views of the device joining the coupling to one pipe segment, FIGS. 24A, 24B, 24C, and 24D are a top view and several side views C-C, respectively, views of the device joining the coupling to the other adjoining pipe segment, and FIGS. 25A and 25B are a top view and a side view C-C, respectively, views of the device releasing the pipe for deployment in the field. Device 2100 is useful for assembly or disassembly of pipe, or is configured for only for assembly of pipe. Device 1400 may be generally similar the device of FIGS. 5, 6, 8 and 14, and are, for example, generally similar to devices 500, 600, 800 and 1400 disclosed herein, except as further discussed below.

Several of the steps of using device 2100, including a spline insertion device 2110 are as follows. First, as in FIGS. 22A, 22B, and 22C first mechanism 512 restrains pipe 10 from moving laterally and a coupler 13 is placed on platform 1803. In one embodiment, coupler 13 is manually placed on platform 1803. As shown in FIG. 22C, a cleaning and lubricating unit 2201 is positioned near the position occupied by coupler 13 to spray a cleaning and lubricating solution on pipes to be inserted into the coupler. Unit 2201 includes a wire brush for cleaning the pipe or pipe segment and, then sprays a solutions including, but are not limited to, a light soap and water solution or a lubricant.

In an alternative embodiment, an automatic control device places coupler 13 at the proper time for assembling pipe. Pipe 10 is then lubricated from spray from lubricating unit 2201. Next, as shown in FIGS. 23A and 23B, arm 863" is moved onto coupler 13 to prevent the coupler from moving, lubricating unit 2201 lubricates pipe 10, and first mechanism 512 forces pipe 10 into coupler 13, and spline insertion device 2110 forces a spline into the coupler to join pipe 10 and coupler 13.

Next, as shown in FIGS. 24A-24C, pipe segment 11 is provided from pipe carrier 820 into second mechanism 514. Pipe segment 11 may be placed manually in second mechanism 514, or may be conveyed from pipe carrier 820. Although not shown in the figures, many conveyer devices are know and are adaptable for moving pipe sections. One such conveyer is a roller chain conveyor with attached dog. Such conveyers ("log chains") are used in the timber industry. A conveyer of the present invention includes, but is not limited to, a roller chain conveyer with attached dogs that protrude from chain to grab individual pipes from a bundle storage or to return the pipes to storage after removing from the field.

Spline insertion device 2110 then forces spline material 2401 towards the coupler (FIG. 24C), and cuts the spline to the correct size and inserts spline 2403 into the coupler to join pipe segment 11 and coupler 13. As shown in FIGS. 25A and 25B, arm 863' is then retracted, and the longer pipe 10' is ready to be transported the length of the pipe segment into the field, and the steps of FIGS. 22-25 are repeated until the desired length of pipe is assembled.

EXAMPLES

Several examples of the use of the pipe drive mechanism of the present invention, as shown for example in FIG. 8, are now presented. These examples are meant to provide illustrative demonstrations of the capabilities of devices of the present invention, and are not meant to limit the scope of the invention.

In the following examples, hydraulic drive wheel motors are driven with a total load force on the drive wheels of about 1500 psi. For transporting pipe through the drive mechanism, a pressure of approximately 1000 pounds per square inch was used. For transporting a pipe and coupling through the drive mechanism, a pressure of approximately 1500 pounds per square inch was used.

Example 1

Transport of 3 Inch Diameter YELOMINE™ Pipe

A pipe drive mechanism was used to install (push) a 600 foot length of 3 inch YELOMINE™ pipe at a rate of approximately 60 feet per minute into a field. The same mechanism was also used to retrieve (pull) 1440 feet of the 3 inch pipe from an existing field.

Example 2

Transport of 10 Inch Diameter YELOMINE™ Pipe

A pipe drive mechanism was used to install a 640 foot length of 10 inch YELOMINE™ pipe at a rate of 28 feet per minute into a field. The same mechanism was also used to retrieve the same 640 foot length of 10 inch pipe at a rate of 45 feet per minute.

Example 3

Transport of 12 Inch Pipe

A pipe drive mechanism was used to install approximately 400 feet of 12 inch diameter PVC pipe into a field.

The invention has now been explained with regard to specific embodiments. Variations on these embodiments and other embodiments may be apparent to those of skill in the art. It is therefore intended that the invention not be limited by the discussion of specific embodiments. It is understood that the examples and embodiments described herein are for illustrative purposes only and that various modifications or changes in light thereof will be suggested to persons skilled in the art and are to be included within the spirit and purview of this application and scope of the appended claims. Thus, for example, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. An apparatus for transporting pipe formed from a plurality of pipe segments, said apparatus comprising:
   a frame;
   a first mechanism supported by said frame and adapted to impart a first force approximately parallel to the longitudinal axis of one or more accepted first pipe segments, where said first force includes a frictional force;
   a second mechanism supported by said frame at a location longitudinally disposed from accepted pipe segments of said first mechanism and adapted to impart a second force approximately parallel to the longitudinal axis of one or more accepted second pipe segments; and
   a third mechanism disposed between said first mechanism and said second mechanism, where said third mechanism includes a device to couple the accepted first and second pipe segments together,
   where said first mechanism and said second mechanism controllably impart said first force and second force in opposite directions to move accepted first and second pipe segments apart from each other, and
   where said first mechanism and said second mechanism controllably impart said first force and second force towards each other with sufficient force to move accepted first and second pipe segments together.

2. The apparatus of claim 1, where said first mechanism includes two or more wheels having peripheral surfaces spaced to accept pipe segments therebetween.

3. The apparatus of claim 2, where said first mechanism further includes a tension mechanism to move at least one of said two or more wheels towards at least one other of said two or more wheels.

4. The apparatus of claim 1, where said second force includes a frictional force.

5. The apparatus of claim 4, where said second mechanism includes two or more wheels having peripheral surfaces spaced to accept pipe therebetween.

6. The apparatus of claim 5, where said second mechanism further includes a tension mechanism to move at least one of said two or more wheels towards at least one other of said two or more wheels.

7. The apparatus of claim 1, wherein said apparatus further includes a vehicle to secure an end of the pipe and translate the pipe way from said first and second mechanism.

8. The apparatus of claim 7, where said first mechanism includes two or more wheels having peripheral surfaces spaced to accept pipe segments therebetween.

9. The apparatus of claim 8, where said first mechanism further includes a tension mechanism to move at least one of said two or more wheels towards at least one other of said two or more wheels.

10. The apparatus of claim 7, where said second force includes a frictional force.

11. The apparatus of claim 10, where said second mechanism includes two or more wheels having peripheral surfaces spaced to accept pipe segments therebetween.

12. The apparatus of claim 11, where said second mechanism further includes a tension mechanism to move at least one of said two or more wheels towards at least one other of said two or more wheels.

13. The apparatus of claim 1, where said first mechanism and said second mechanism accept pipe segments having a diameter ranging from a first diameter to a second diameter, where said second diameter is greater than said first diameter.

14. The apparatus of claim 13, where said first diameter is approximately 1 inch and where said second diameter is approximately 18 inches.

15. The apparatus of claim 13, where said first diameter is approximately 3 inches and where said second diameter is approximately 12 inches.

16. The apparatus of claim 1, where said first mechanism and said second mechanism accept pipe segments having a diameter between approximately 1 inch and approximately 18 inches.

17. The apparatus of claim 1, where said pipe segments are spline-coupled and where said device includes an actuator to insert a spline.

18. An apparatus for transporting pipe formed from a plurality of pipe segments, said apparatus comprising:
   a frame;
   a first mechanism supported by said frame and having two or more wheels, where at least one of said two or more wheels is a drive wheel, where each of said two or more wheels has a peripheral surfaces spaced to contact one or more first pipe segments placed therebetween, and where said drive wheels are controllably rotated to impart longitudinal forces on contacted first pipe segments; and
   a second mechanism supported by said frame and having two or more wheels, where at least one of said two or more wheels is a drive wheel, where each of said two or more wheels has a peripheral surfaces spaced to contact one or more second pipe segments placed therebetween, and where said drive wheels are controllably rotated to impart longitudinal forces on contacted second pipe segments; and
   a third mechanism disposed between said first mechanism and said second mechanism, where said third mechanism includes a device to couple the contacted first and second pipe segments together,
   where said drive wheels of said first and second mechanism are controllably rotated in opposite directions to move adjacent contacted first and second pipe segments apart from each other, and
   where said first mechanism and said second mechanism controllably rotate corresponding drive wheels in the same direction on the contacted first and second pipe segments with sufficient force to move contacted first and second pipe segments together.

19. The apparatus of claim 18, where said first mechanism further includes a tension mechanism to move at least one of said two or more wheels towards at least one other of said two or more wheels.

20. The apparatus of claim 18, where said second mechanism further includes a tension mechanism to move at least one of said two or more wheels towards at least one other of said two or more wheels.

21. The apparatus of claim 18, wherein said apparatus further includes a vehicle to secure an end of the pipe and translate the pipe way from said first and second mechanism.

22. The apparatus of claim 18, where said first mechanism and said second mechanism accept pipe segments having a diameter ranging from a first diameter to a second diameter, where said second diameter is greater than said first diameter.

23. The apparatus of claim 22, where said first diameter is approximately 1 inch and where said second diameter is approximately 18 inches.

24. The apparatus of claim 22, where said first diameter is approximately 3 inches and where said second diameter is approximately 12 inches.

25. The apparatus of claim 18, where said first mechanism and said second mechanism accept pipe segments having a diameter between approximately 1 inch and approximately 18 inches.

26. The apparatus of claim 18, where said pipe segments are spline-coupled and where said device includes an actuator to insert a spline.

* * * * *